United States Patent
Yamada

(10) Patent No.: US 9,411,139 B2
(45) Date of Patent: Aug. 9, 2016

(54) IMAGING OPTICAL SYSTEM, IMAGING OPTICAL DEVICE, AND DIGITAL APPARATUS

(71) Applicant: KONICA MINOLTA, INC., Chiyoda-ku (JP)

(72) Inventor: Keiko Yamada, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/745,102

(22) Filed: Jun. 19, 2015

(65) Prior Publication Data

US 2015/0370044 A1    Dec. 24, 2015

(30) Foreign Application Priority Data

Jun. 23, 2014    (JP) .................................. 2014-128110

(51) Int. Cl.

| | |
|---|---|
| *G02B 9/12* | (2006.01) |
| *G02B 15/173* | (2006.01) |
| *G02B 9/64* | (2006.01) |
| *G02B 13/00* | (2006.01) |

(52) U.S. Cl.
CPC ............... *G02B 15/173* (2013.01); *G02B 9/64* (2013.01); *G02B 13/006* (2013.01)

(58) Field of Classification Search
CPC ...... G02B 15/173; G02B 13/006; G02B 9/12; G02B 9/14
See application file for complete search history.

(56) References Cited

U.S. PATENT DOCUMENTS

2012/0050872 A1*    3/2012    Ito ............................ G02B 7/08
                                                                    359/601

FOREIGN PATENT DOCUMENTS

| JP | 2012-242472 | 12/2012 |
|---|---|---|
| JP | 2013-3324 | 1/2013 |

* cited by examiner

*Primary Examiner* — Joseph P Martinez
(74) *Attorney, Agent, or Firm* — Cozen O'Connor

(57) ABSTRACT

An imaging optical system includes first to third lens groups, and performs focusing by moving the second lens group, to satisfy the following conditional expressions:

$0.8 < 1Gr\_Fl/FL < 1.2$, $0.6 < |2Gr\_Fl/FL| < 2.5$, $0.6 < 3Gr\_Fl/FL < 1.8$ $0.8 < 1Gr\_R\_nop/1Gr\_Thi < 1.1$, and $-0.6 < 2Gr\_R\_nop/2Gr\_Thi < 1.6$ where FL, 1Gr_Fl, 2Gr_Fl, and 3Gr_Fl represent focal lengths of the entire system, and the first to third lens groups, respectively, 1Gr_R_nop represents a distance from the outermost surface of the first lens group on the object side to a rear principal point of the first lens group, 1Gr_Thi represents a total length of the first lens group, 2Gr_R_nop represents a distance from the outermost surface of the second lens group on the object side to a rear principal point of the second lens group, and 2Gr_Thi represents a total length of the second lens group.

10 Claims, 21 Drawing Sheets

EX1-POS1

EX1-POS1

EX1-POS1

EX1-POS1

EX1-POS2

EX1-POS2

EX1-POS2

EX2-POS1

EX2-POS1

EX2-POS1

EX2-POS2

EX2-POS2

EX2-POS2

EX3-POS1

EX3-POS1

EX3-POS1

EX3-POS2

EX3-POS2

EX3-POS2

EX4-POS1

EX4-POS1

EX4-POS1

EX4-POS2

EX4-POS2

EX4-POS2

EX5-POS1

EX5-POS1

EX5-POS1

EX5-POS2

EX5-POS2

EX5-POS2

EX1-POS1
FIG. 11A
TANGENTIAL  1.00 RELATIVE FIELD HEIGHT (22.42)°
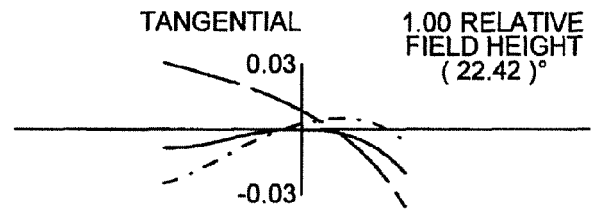
FIG. 11F
SAGITTAL
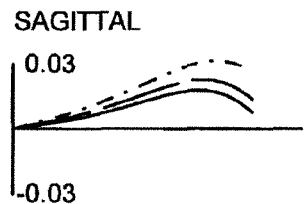
FIG. 11B
0.90 RELATIVE FIELD HEIGHT (20.37)°
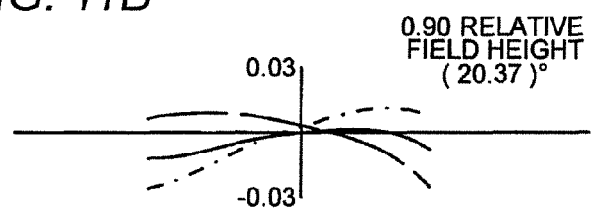
FIG. 11G
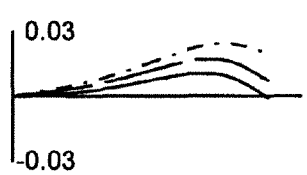
FIG. 11C
0.70 RELATIVE FIELD HEIGHT (16.11)°
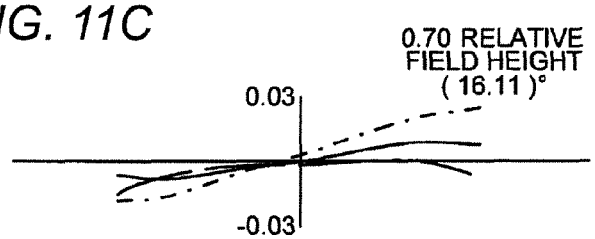
FIG. 11H
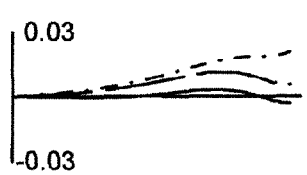
FIG. 11D
0.50 RELATIVE FIELD HEIGHT (11.65)°
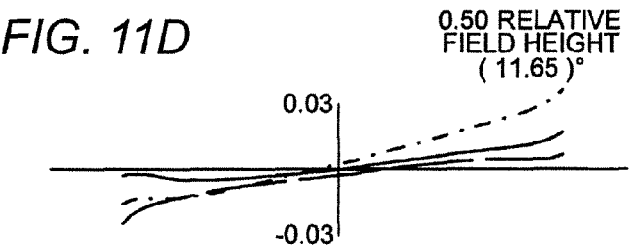
FIG. 11I
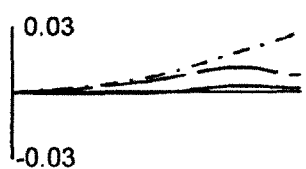
FIG. 11E
0.00 RELATIVE FIELD HEIGHT (0.000)°
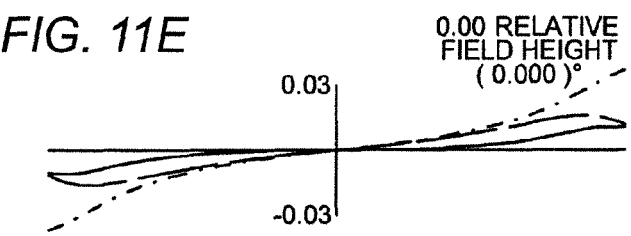
FIG. 11J
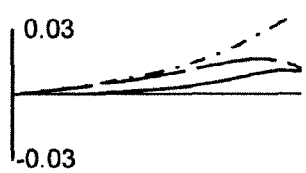
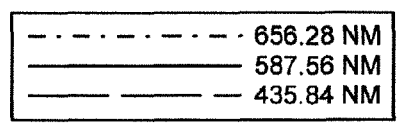

EX1-POS2

TANGENTIAL — 1.00 RELATIVE FIELD HEIGHT (20.42)° — SAGITTAL 0.90 RELATIVE FIELD HEIGHT (18.52)°

0.70 RELATIVE FIELD HEIGHT (14.60)°

0.50 RELATIVE FIELD HEIGHT (10.54)°

0.00 RELATIVE FIELD HEIGHT (0.000)°

— · — · — 656.28 NM
———— 587.56 NM
— — — 435.84 NM

EX2-POS1

— · — · — 656.28 NM
——— 587.56 NM
— — — 435.84 NM

EX2-POS2
FIG. 14A 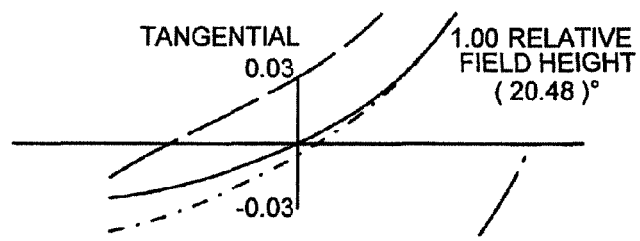 FIG. 14F 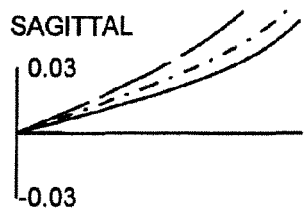
FIG. 14B 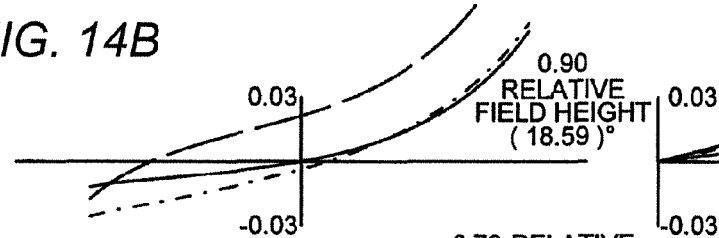 FIG. 14G 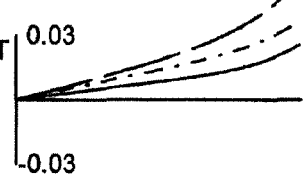
FIG. 14C 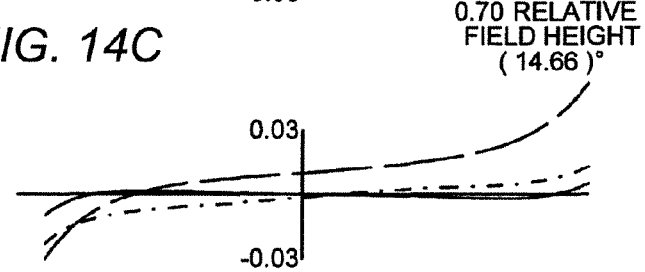 FIG. 14H 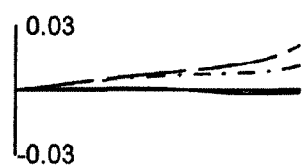
FIG. 14D 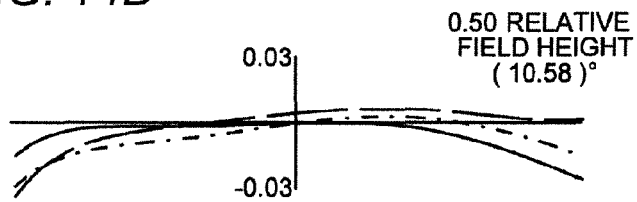 FIG. 14I 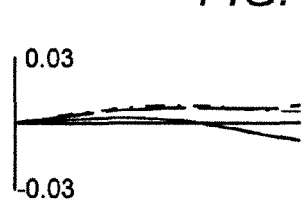
FIG. 14E 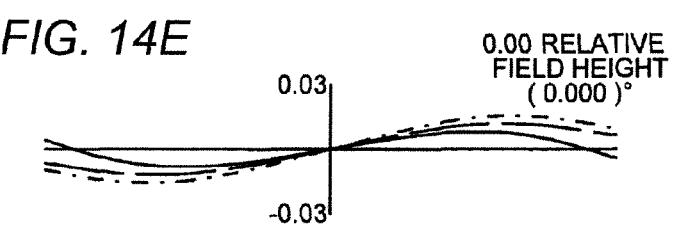 FIG. 14J 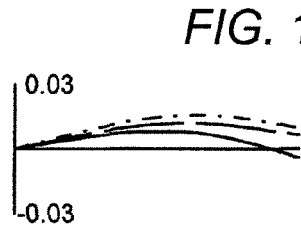
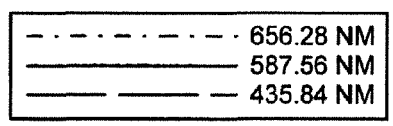

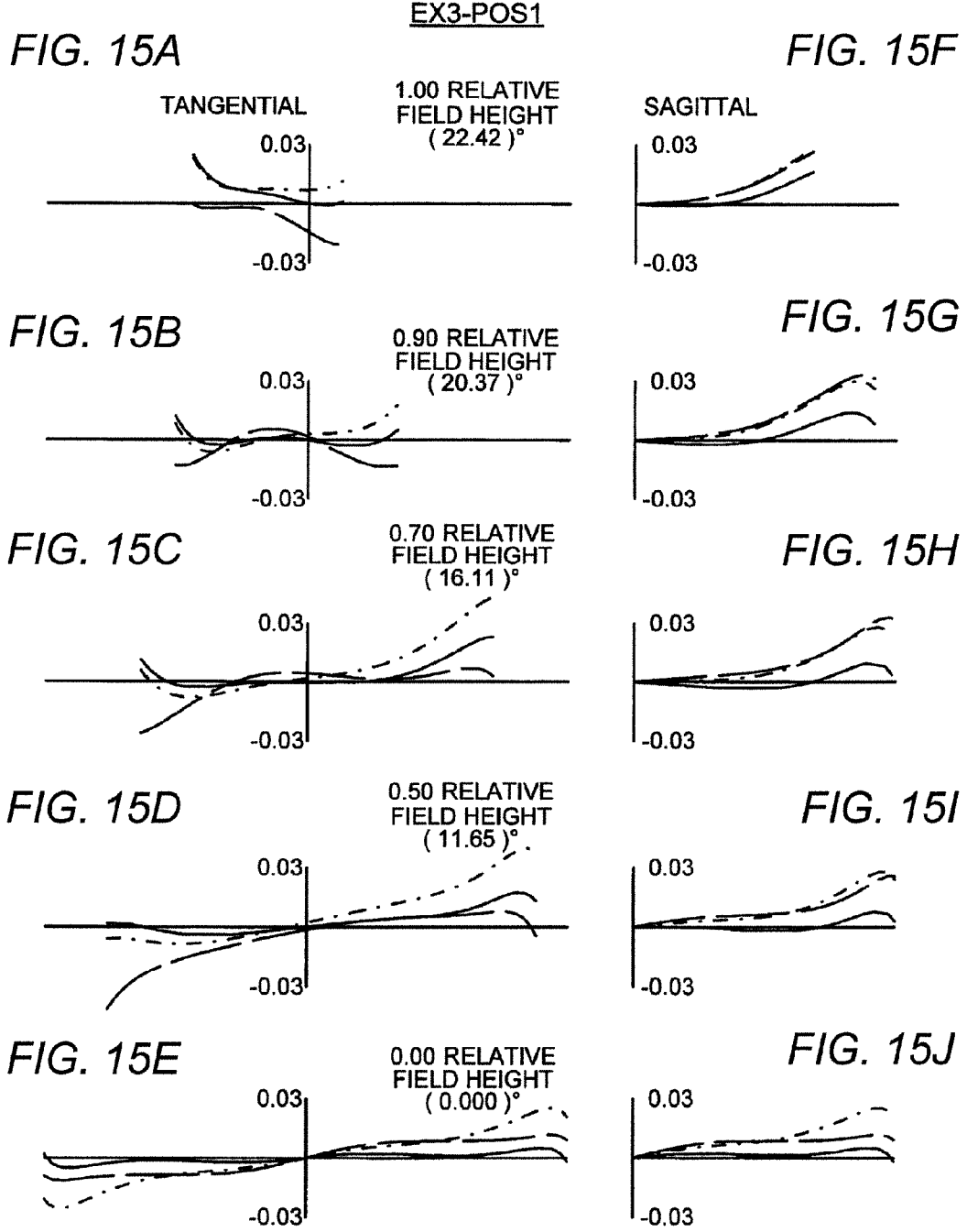

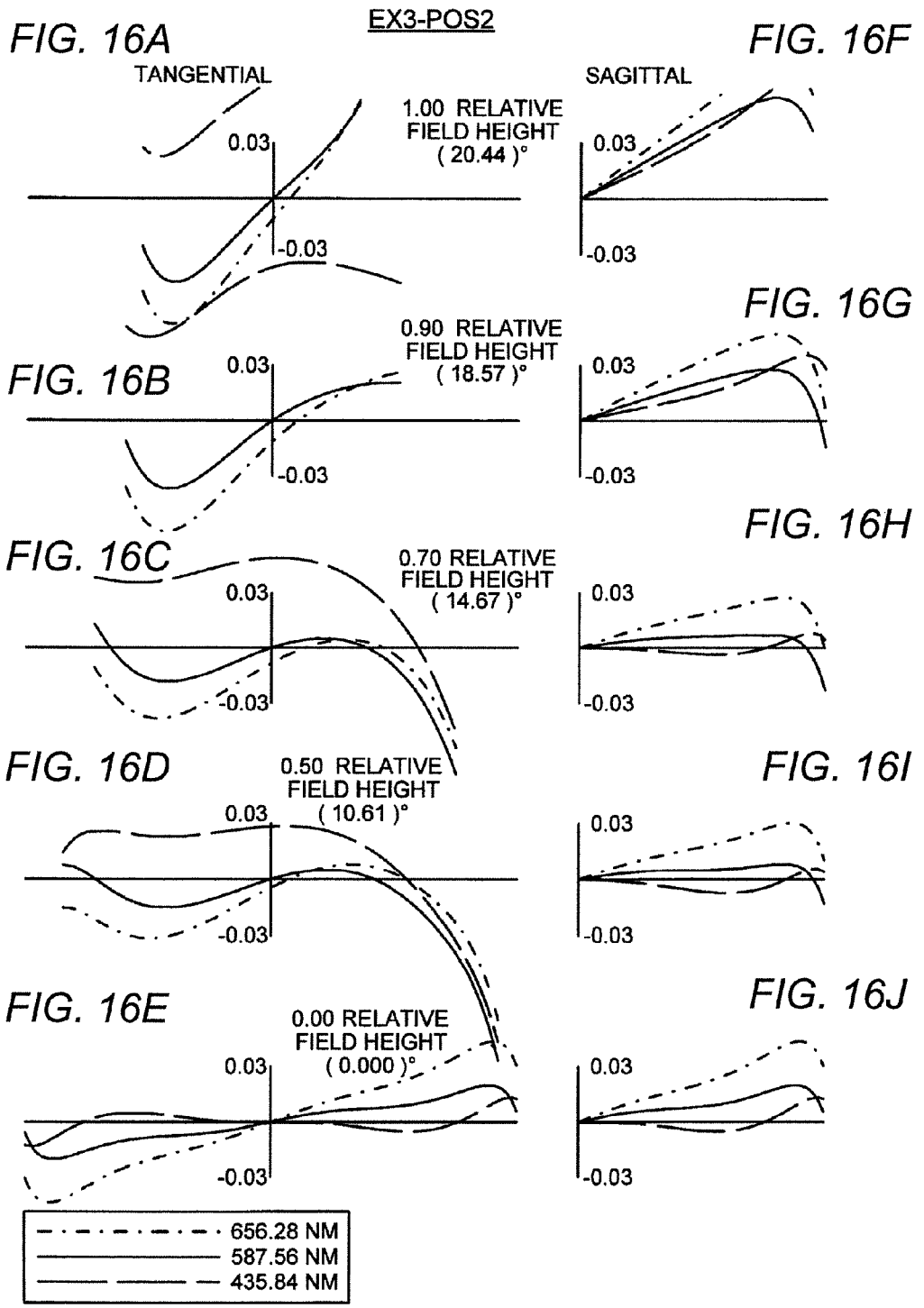

EX4-POS1

TANGENTIAL   1.00 RELATIVE FIELD HEIGHT (22.42)°

SAGITTAL 0.90 RELATIVE FIELD HEIGHT (20.37)°

0.70 RELATIVE FIELD HEIGHT (16.11)°

0.50 RELATIVE FIELD HEIGHT (11.65)°

0.00 RELATIVE FIELD HEIGHT (0.000)°

— · — · — 656.28 NM
————— 587.56 NM
— — — 435.84 NM

EX4-POS2
FIG. 18A  TANGENTIAL  1.00 RELATIVE FIELD HEIGHT (8.654)°  FIG. 18F  SAGITTAL
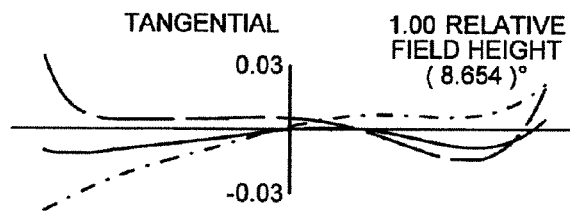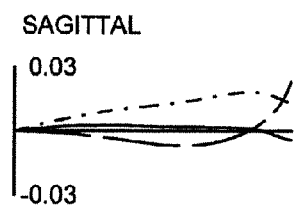
FIG. 18B  0.75 RELATIVE FIELD HEIGHT (6.512)°  FIG. 18G
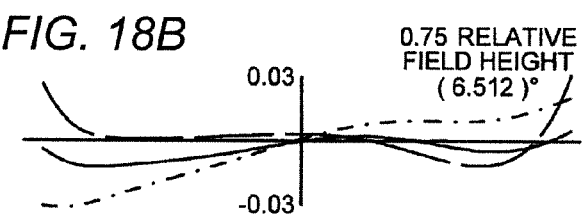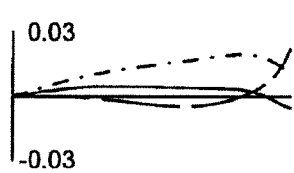
FIG. 18C  0.50 RELATIVE FIELD HEIGHT (4.352)°  FIG. 18H
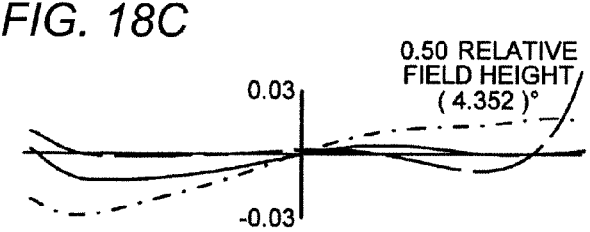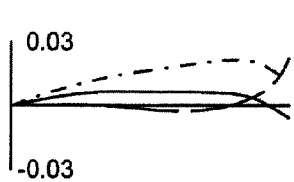
FIG. 18D  0.25 RELATIVE FIELD HEIGHT (2.179)°  FIG. 18I
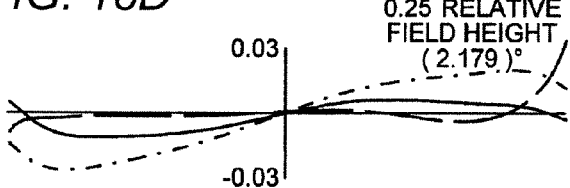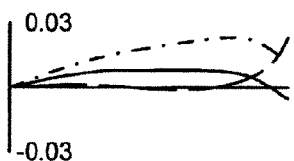
FIG. 18E  0.00 RELATIVE FIELD HEIGHT (0.000)°  FIG. 18J
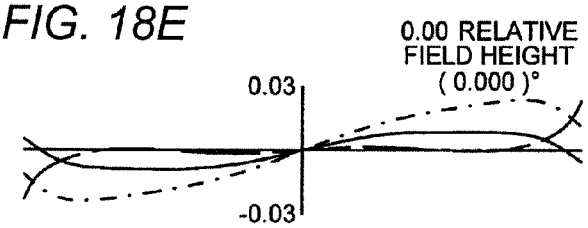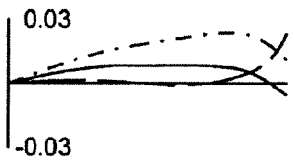
— · — · — 656.28 NM
———— 587.56 NM
— — — 435.84 NM EX5-POS1
FIG. 19A — TANGENTIAL, 1.00 RELATIVE FIELD HEIGHT (22.41)°
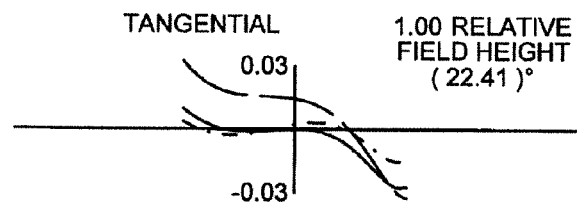
FIG. 19F — SAGITTAL
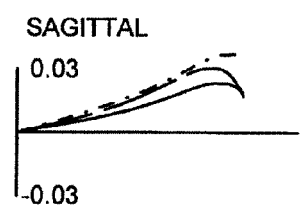
FIG. 19B — 0.90 RELATIVE FIELD HEIGHT (20.36)°
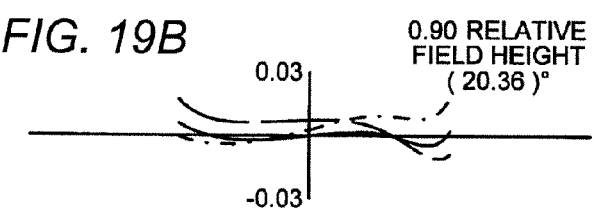
FIG. 19G
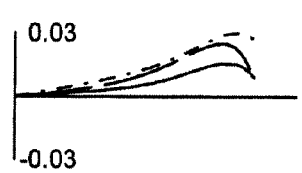
FIG. 19C — 0.70 RELATIVE FIELD HEIGHT (16.10)°
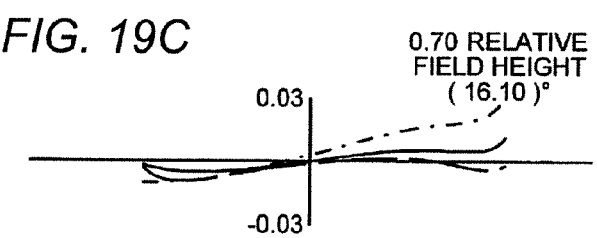
FIG. 19H
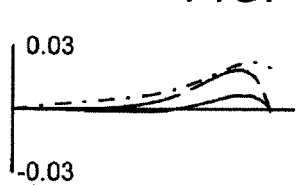
FIG. 19D — 0.50 RELATIVE FIELD HEIGHT (11.65)°
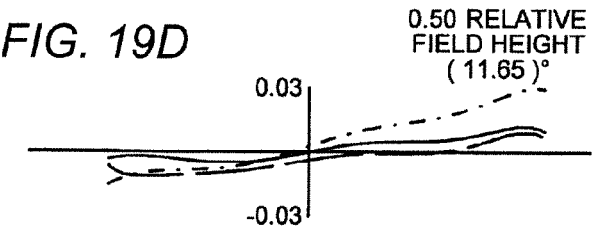
FIG. 19I
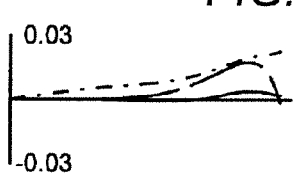
FIG. 19E — 0.00 RELATIVE FIELD HEIGHT (0.000)°
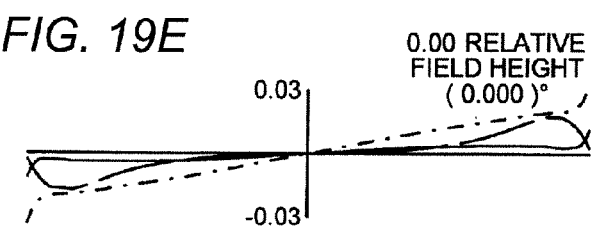
FIG. 19J
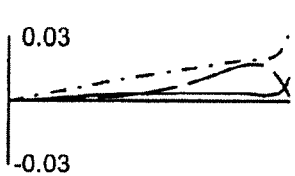
— · — · — 656.28 NM
———— 587.56 NM
— — — 435.84 NM

EX5-POS2

—··—··— 656.28 NM
———— 587.56 NM
— — — 435.84 NM

IMAGING OPTICAL SYSTEM, IMAGING OPTICAL DEVICE, AND DIGITAL APPARATUS

The entire disclosure of Japanese Patent Application No. 2014-128110 filed on Jun. 23, 2014 including description, claims, drawings, and abstract are incorporated herein by reference in its entirety.

BACKGROUND OF THE INVENTION

1. Field of the Invention

The present invention relates to an imaging optical system, an imaging optical device, and a digital apparatus. For example, the present invention relates to a compact but large-diameter standard lens of an inner focus type suitable for an interchangeable lens digital camera that captures a video image of an object with an imaging element (a solid-state imaging element such as a CCD (Charge Coupled Device) image sensor or a CMOS (Complementary Metal-Oxide Semiconductor) image sensor, for example), an imaging optical device that outputs a video image of an object captured with the standard lens and an imaging element as an electrical signal, and a digital apparatus having an image input function such as a digital camera equipped with the imaging optical device.

2. Description of the Related Art

The compactness of mirrorless interchangeable lens cameras that are single-lens reflex cameras minus flip-up mirrors has been welcomed by users recently, and the market of such mirrorless interchangeable lens cameras is now expanding. Some of the mirrorless interchangeable lens cameras are not capable of using phase detection AF (autofocus), unlike the majority of conventional single-lens reflex cameras. Such a camera performs focusing by scanning a focusing group and detecting the location where the highest contrast is achieved, or uses so-called contrast AF.

The problem in such a case is the weight of the focusing group. In the case of phase detection AF, information from the AF sensor is used, and the moving distance required for the focusing group to perform focusing can be calculated. Accordingly, the focusing group can be moved in accordance with the calculated moving distance. In the case of contrast AF, on the other hand, the information obtained from the AF sensor is only the contrast value at that moment, and performs a focusing operation by moving the focusing group and searching for the location where the highest contrast is achieved while reading variation in contract at given times. Therefore, the moving distance of the focusing group before focusing in the case of contrast AF is much longer than that in the case of phase detection AF.

In view of the above, a reduction in the weight of the focusing group is critical for an imaging optical system to cope with contrast AF (see JP 2013-3324 A and JP 2012-242472 A, for example).

JP 2013-3324 A discloses a structure that includes a first lens group of positive lenses, a second lens group of negative lenses, and a third lens group of positive lenses, and moves the second lens group toward the image side at a time of focusing. So as to reduce the weight of the focusing group, the second lens group is formed with one to three lenses. However, the second lens group has a high magnification, and the first lens group has a long total length so as to correct coma aberration that occurs in the second lens group. As a result, the total lens length becomes undesirably long.

JP 2012-242472 A also discloses a structure that includes a first lens group of positive lenses, a second lens group of negative lenses, and a third lens group of positive lenses, and moves the second lens group toward the image side at a time of focusing. So as to reduce the weight of the focusing group, the second lens group is formed with one negative lens. However, the stop is placed in the first lens group. As a result, the variation caused in coma aberration due to an off-axis light flux at a time of magnifying becomes larger.

SUMMARY OF THE INVENTION

The present invention has been made in view of the above circumstances, and an object thereof is to provide a high-performance compact imaging optical system of an inner focus type that has a large diameter and a focusing group with a reduced weight, an imaging optical device equipped with the imaging optical system, and a digital apparatus.

To achieve the abovementioned object, according to an aspect, an imaging optical system reflecting one aspect of the present invention comprises a first lens group of positive lenses, a second lens group of negative lenses, and a third lens group of positive lenses in order from the object side, and performs focusing on a nearby object by moving the entire second lens group along the optical axis toward the image side, to satisfy the following conditional expressions (1) to (5):

$$0.8 < 1Gr\_Fl/FL < 1.2 \tag{1}$$

$$0.6 < |2Gr\_Fl/FL| < 2.5 \tag{2}$$

$$0.6 < 3Gr\_Fl/FL < 1.8 \tag{3}$$

$$0.8 < 1Gr\_R\_nop/1Gr\_Thi < 1.1 \tag{4}$$

$$-0.6 < 2Gr\_R\_nop/2Gr\_Thi < 1.6 \tag{5}$$

where

FL represents the focal length of the entire system,

1Gr_Fl represents the focal length of the first lens group,

2Gr_Fl represents the focal length of the second lens group,

3Gr_Fl represents the focal length of the third lens group,

1Gr_R_nop represents the distance from the outermost surface of the first lens group on the object side to the rear principal point of the first lens group, 1Gr_Thi represents the total length of the first lens group, 2Gr_R_nop represents the distance from the outermost surface of the second lens group on the object side to the rear principal point of the second lens group, and 2Gr_Thi represents the total length of the second lens group.

According to the imaging optical system of Item. 2, in Item. 1, the following conditional expression (6) is preferably satisfied:

$$2.0 < \beta\_2Gr/\beta\_3Gr < 12.0 \tag{6}$$

where

β_2Gr represents the lateral magnification of the second lens group when the object distance is infinite, and β_3Gr represents the lateral magnification of the third lens group when the object distance is infinite.

According to the imaging optical system of Item. 3, in Item. 1 or 2, the first lens group preferably includes a front group and a rear group in order from the object side, the lens closest to the image side in the front group preferably has a concave surface facing the image side, the lens closest to the object side in the rear group preferably has a concave surface facing the object side, the axial spacing between the front group and the rear group is preferably the largest among the axial spacings in the first lens group, and the following conditional expressions (7) and (8) are preferably satisfied:

$$-0.2 < FL/1aGr\_Fl < 0.3 \qquad (7)$$

$$0.6 < 1bGr\_Fl/FL < 1.0 \qquad (8)$$

where

1aGr_Fl represents the focal length of the front group, and 1bGr_Fl represents the focal length of the rear group.

According to the imaging optical system of Item. 4, in any one of Items. 1 to 3, the first lens group preferably includes at least one aspherical lens, and the aspherical lens preferably has an aspherical shape on the object side, the curvature radius of the aspherical shape being smaller at a longer distance from the optical axis.

According to the imaging optical system of Item. 5, in any one of Items. 1 to 4, the third lens group preferably includes a positive-power lens and a negative-power lens.

According to the imaging optical system of Item. 6, in any one of Items. 1 to 5, the imaging optical system is preferably an imaging optical system for forming an optical image of an object on the imaging surface of an imaging element, and when half the diagonal length of the screen size of the imaging surface is set as the maximum image height, the following conditional expression (9) is preferably satisfied:

$$4.0 < TL/(FL \times \tan \omega) < 6.5 \qquad (9)$$

where

TL represents the total length of the entire system (the distance from the vertex of the lens surface closest to the object side to the imaging surface), and ω represents the maximum half field angle.

According to the imaging optical system of Item. 7, in any one of Items. 1 to 6, the following conditional expression (10) is preferably satisfied:

$$W\_2Gr < 25 \qquad (10)$$

where

W_2Gr represents the total weight (g) of the lens components constituting the second lens group.

According to the imaging optical system of Item. 8, in any one of Items. 1 to 7, the imaging optical system is preferably an imaging optical system for forming an optical image of an object on the imaging surface of an imaging element, and when half the diagonal length of the screen size of the imaging surface is set as the maximum image height, the following conditional expression (11) is preferably satisfied:

$$40 < 2\omega < 50 \qquad (11)$$

where

ω represents a maximum half field angle.

According to an imaging optical device of Item. 9, the imaging optical device preferably includes: the imaging optical system of any one of Items. 1 to 8; and an imaging element that converts an optical image formed on an imaging surface into an electrical signal, wherein the imaging optical system is preferably positioned so that an optical image of an object is formed on the imaging surface of the imaging element.

According to a digital apparatus of Item. 10, the digital apparatus preferably includes the imaging optical device of Item. 9, wherein the digital apparatus preferably has at least one of a function to take a still image of an object and a function to take a moving image of an object.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 11A to 11J are lateral aberration graphs in a first focus position of Example 1;

FIGS. 14A to 14J are lateral aberration graphs in the second focus position of Example 2;

FIGS. 15A to 15J are lateral aberration graphs in the first focus position of Example 3;

FIGS. 16A to 16J are lateral aberration graphs in the second focus position of Example 3;

FIGS. 18A to 18J are lateral aberration graphs in the second focus position of Example 4;

FIGS. 19A to 19J are lateral aberration graphs in the first focus position of Example 5;

DESCRIPTION OF THE PREFERRED EMBODIMENTS

Figure 1:
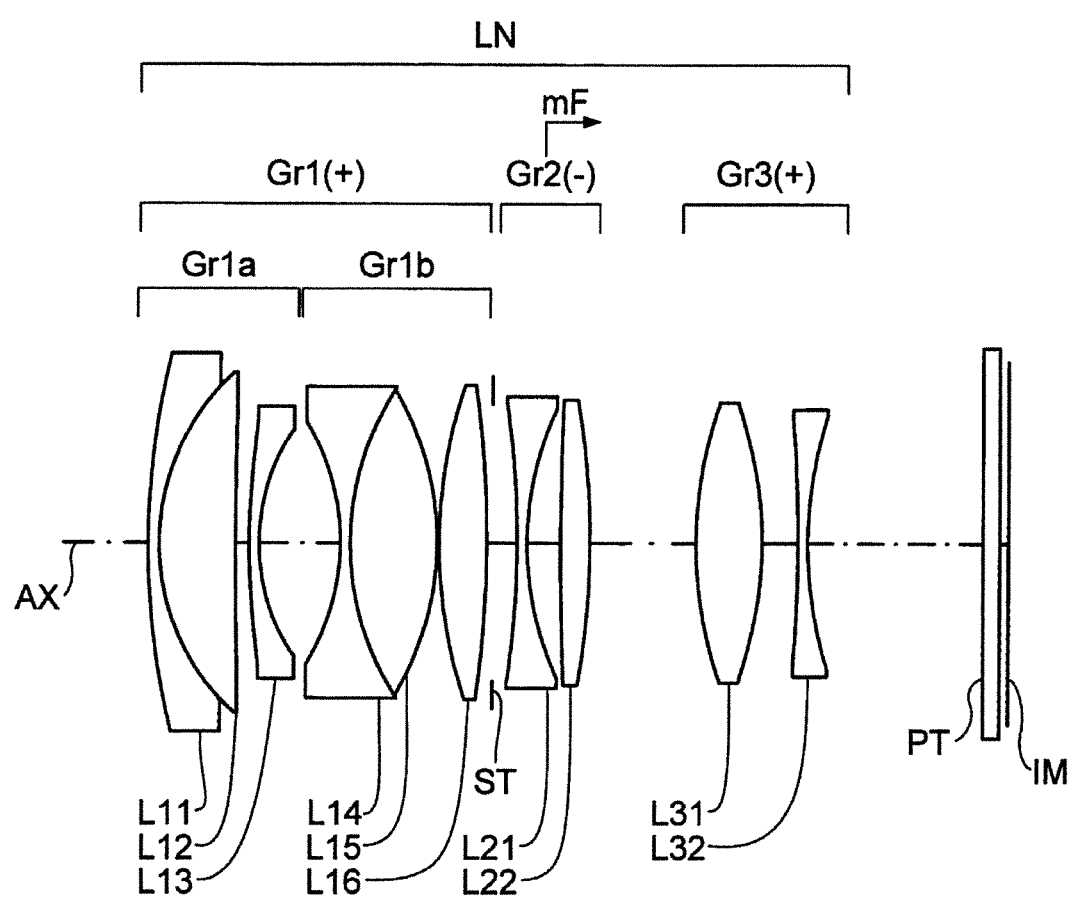
FIG. 1 is a lens structure diagram of a first embodiment (Example 1)
Figure 2:
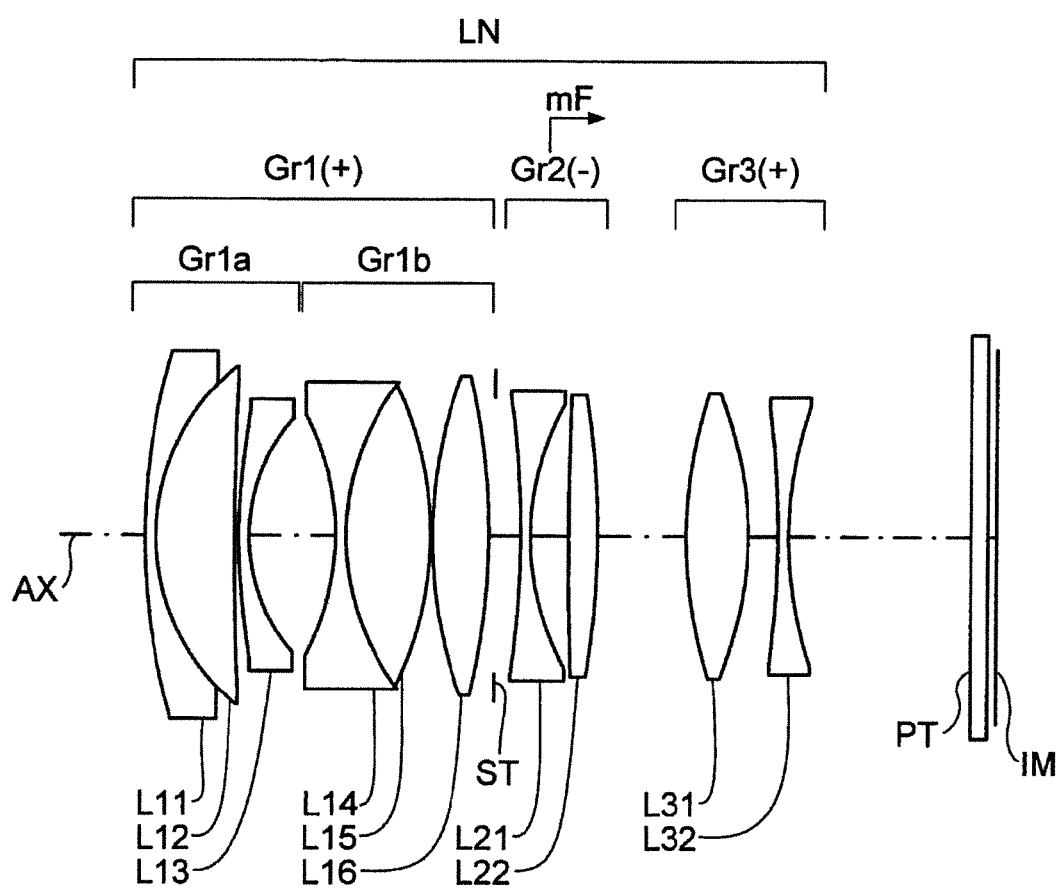
FIG. 2 is a lens structure diagram of a second embodiment (Example 2)
Figure 3:
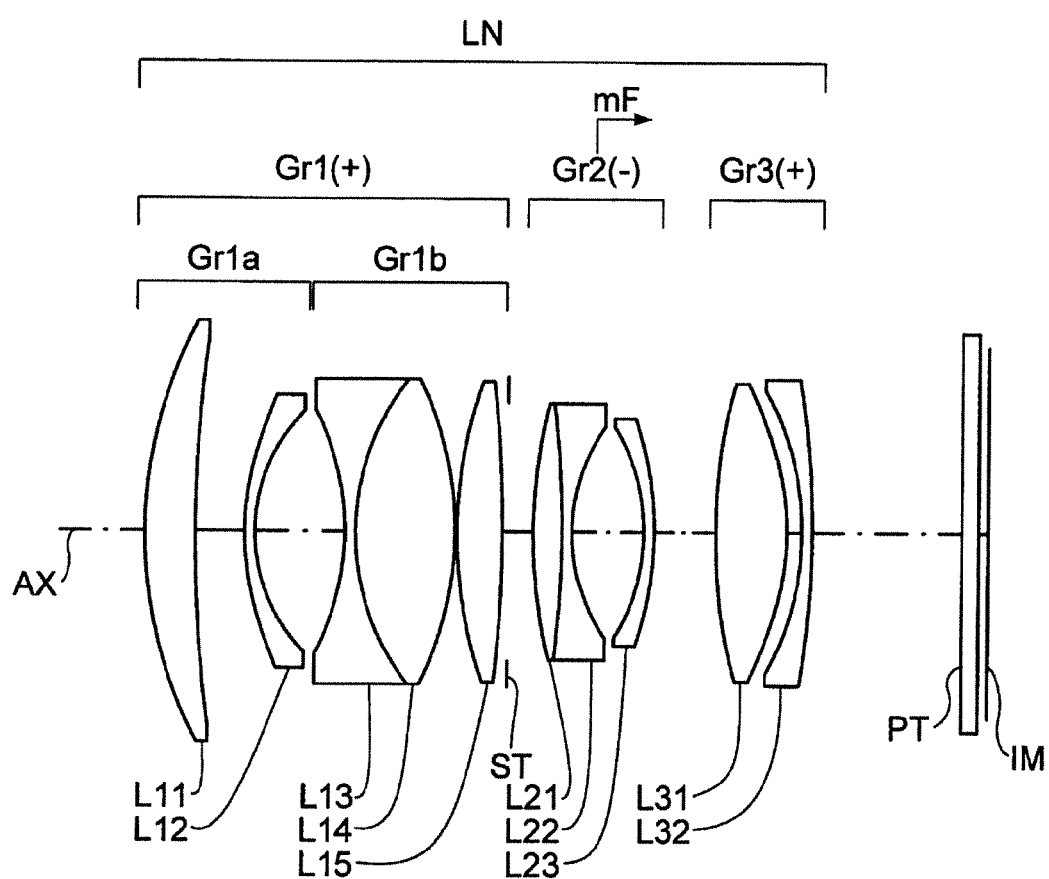
FIG. 3 is a lens structure diagram of a third embodiment (Example 3)
Figure 4:
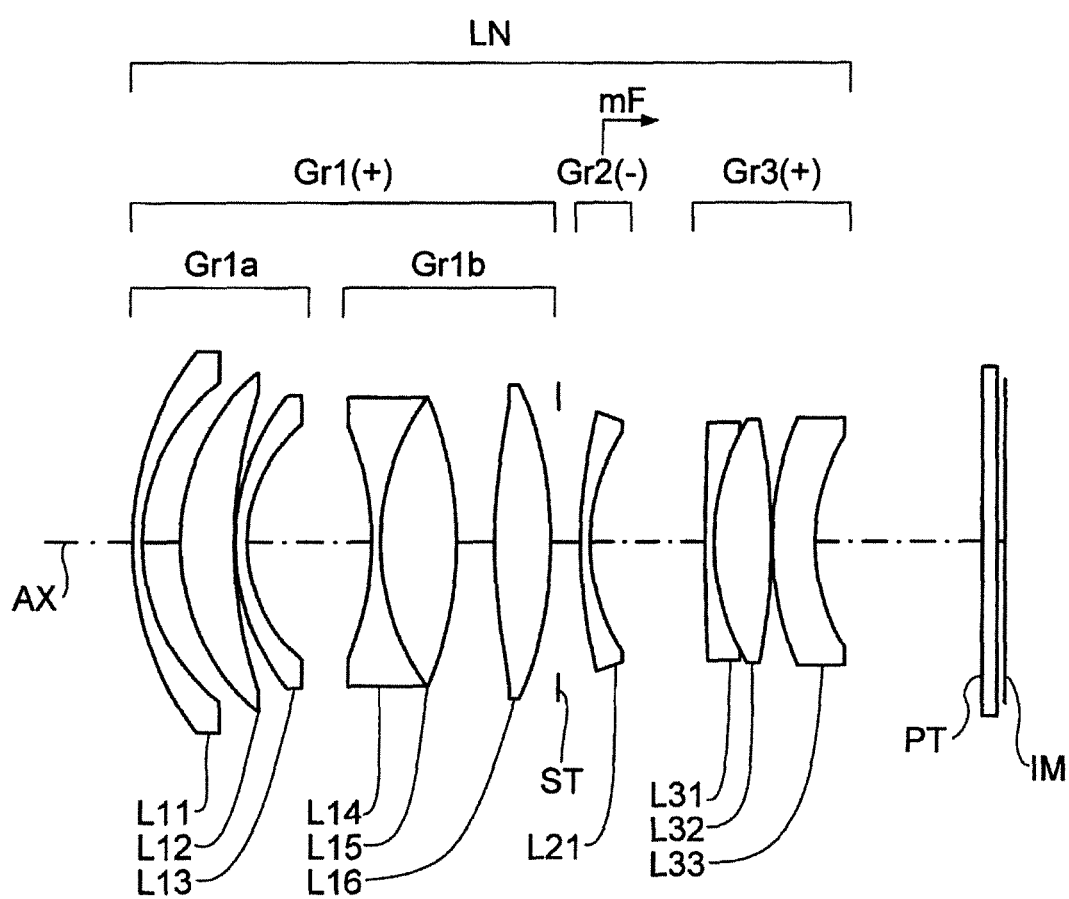
FIG. 4 is a lens structure diagram of a fourth embodiment (Example 4)
Figure 5:
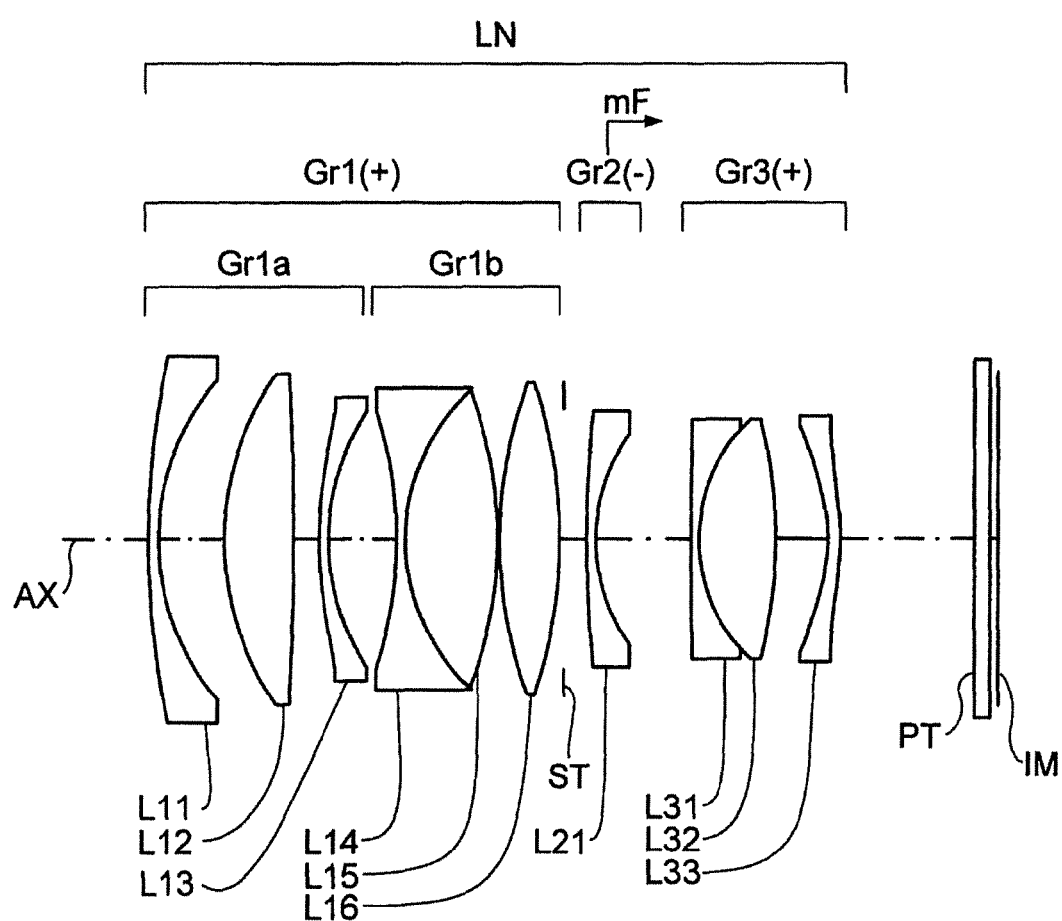
FIG. 5 is a lens structure diagram of a fifth embodiment (Example 5)
Figure 6A:
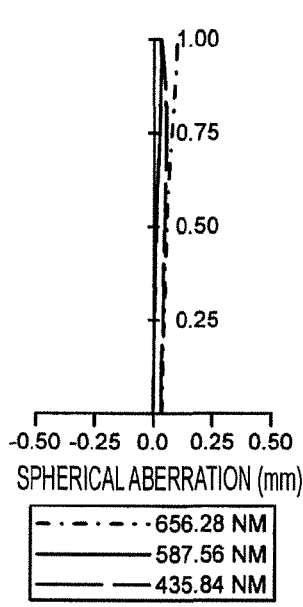
FIGS. 6A to 6F are longitudinal aberration graphs of Example 1.
Figure 6B:
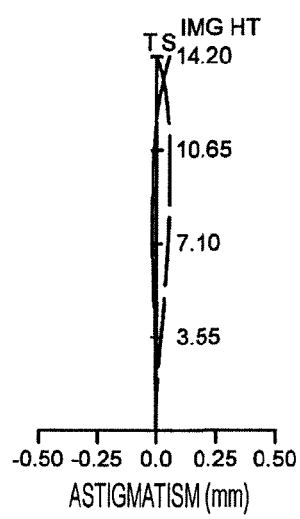
Figure 6C:
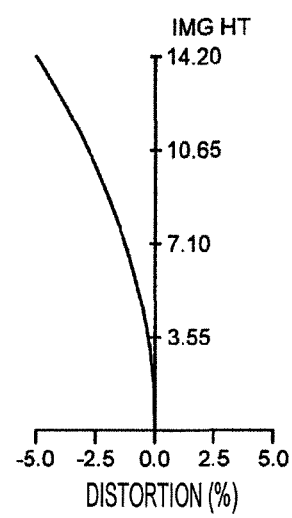
Figure 6D:
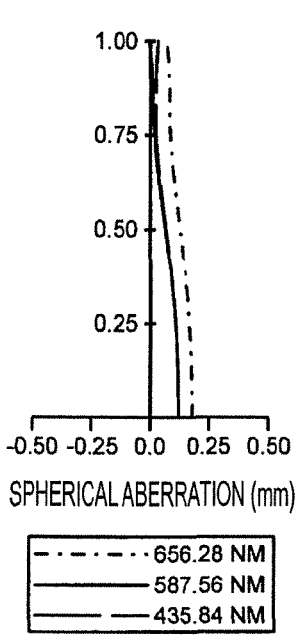
Figure 6E:
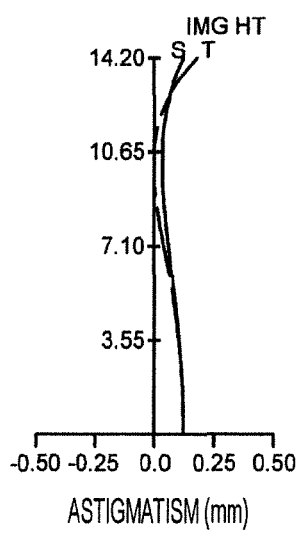
Figure 6F:
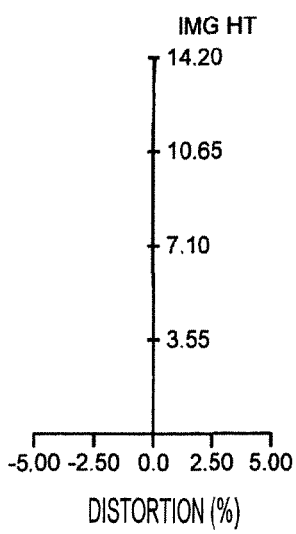
Figure 7A:
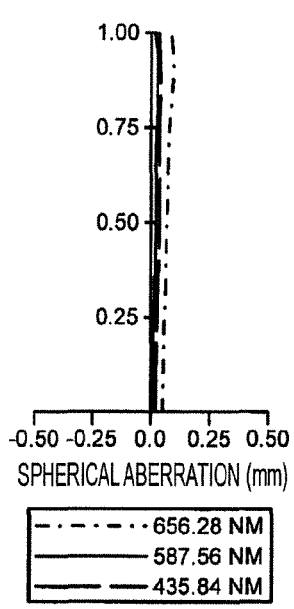
FIGS. 7A to 7F are longitudinal aberration graphs of Example 2.
Figure 7B:
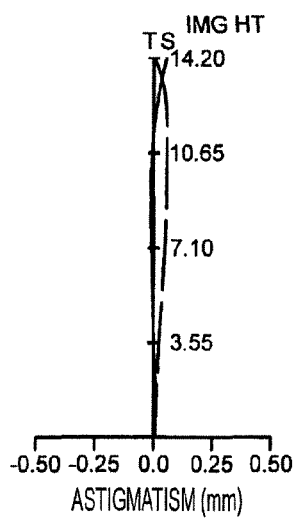
Figure 7C:
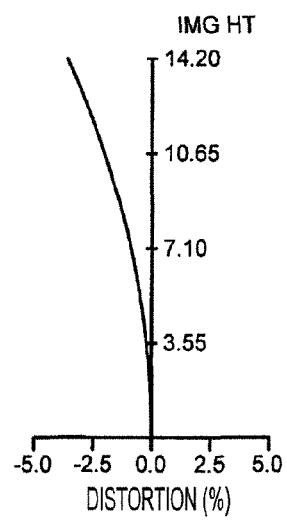
Figure 7D:
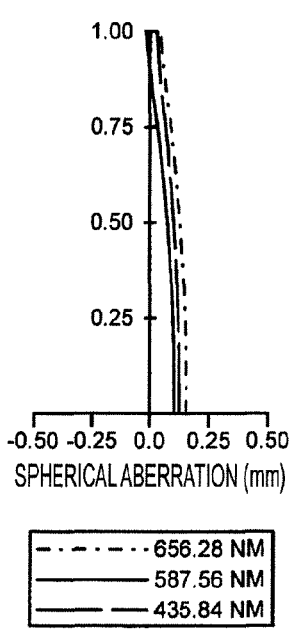
Figure 7E:
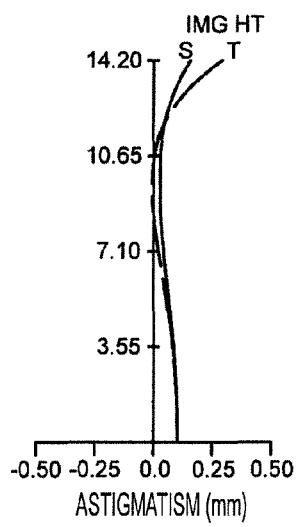
Figure 7F:
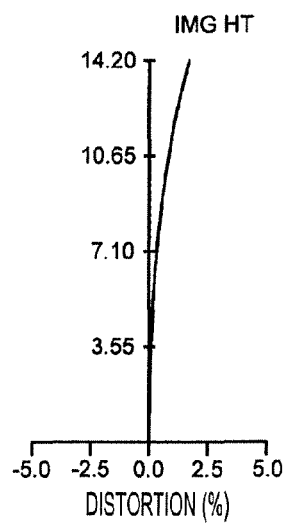
Figure 8A:
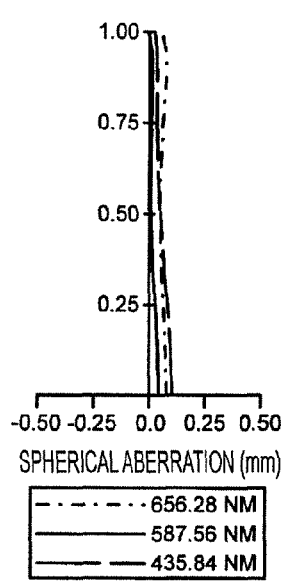
FIGS. 8A to 8F are longitudinal aberration graphs of Example 3.
Figure 8B:
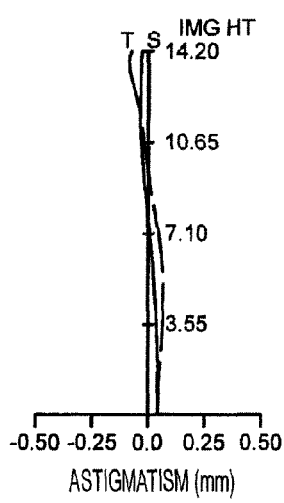
Figure 8C:
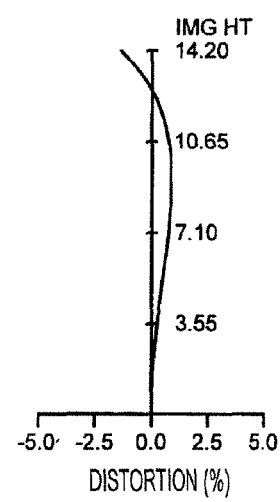
Figure 8D:
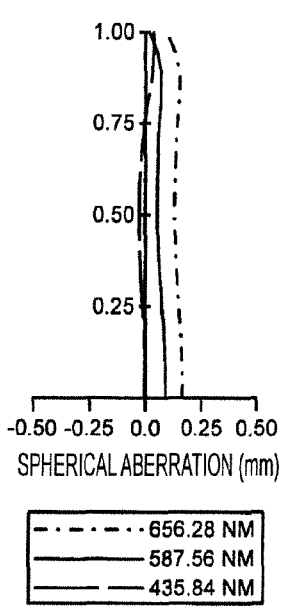
Figure 8E:
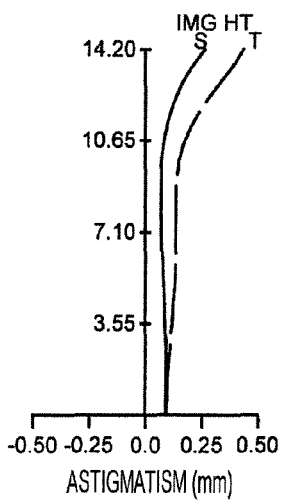
Figure 8F:
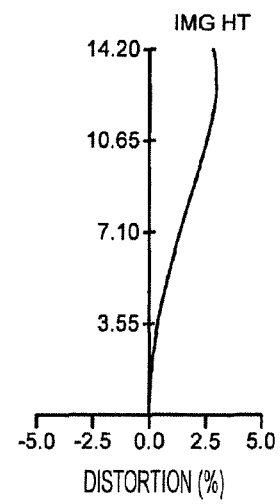
Figure 9A:
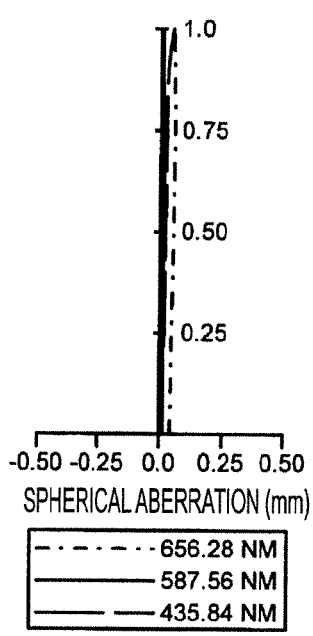
FIGS. 9A to 9F are longitudinal aberration graphs of Example 4.
Figure 9B:
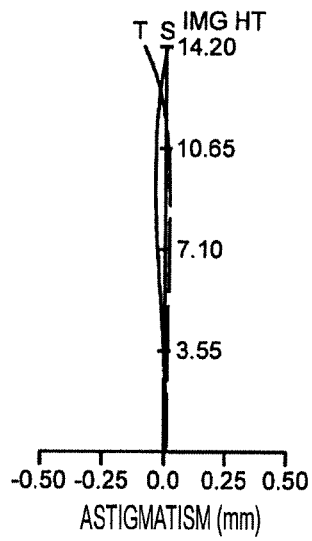
Figure 9C:
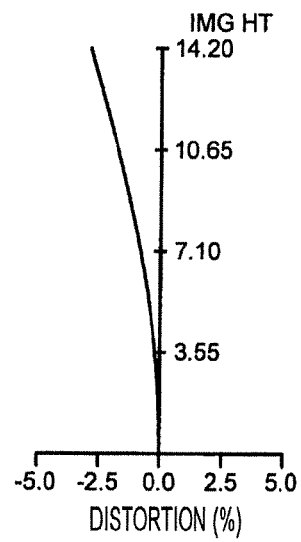
Figure 9D:
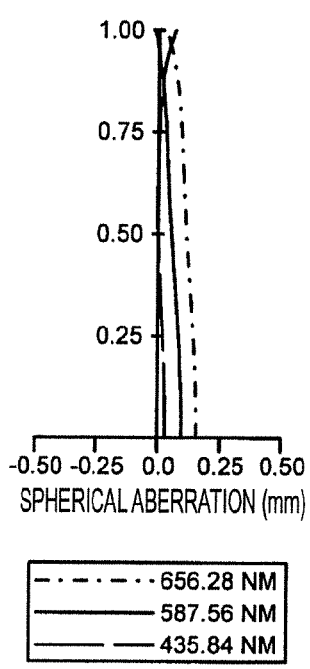
Figure 9E:
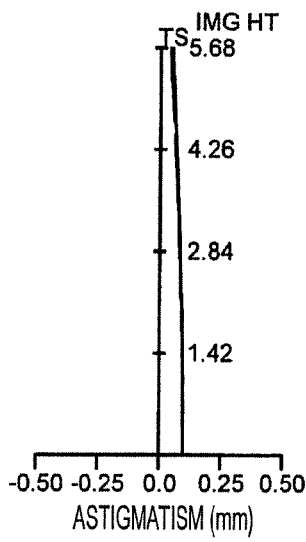
Figure 9F:
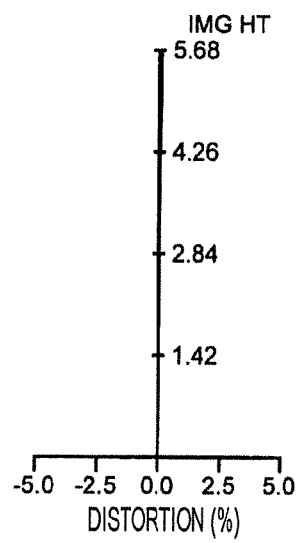
Figure 10A:
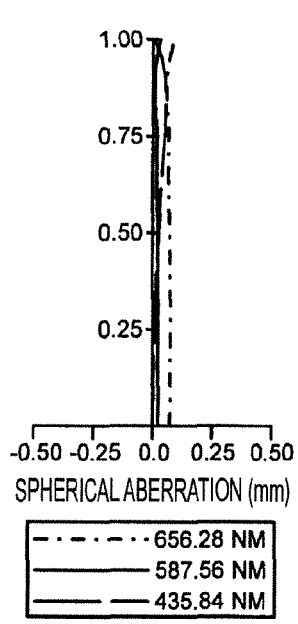
FIGS. 10A to 10F are longitudinal aberration graphs of Example 5.
Figure 10B:
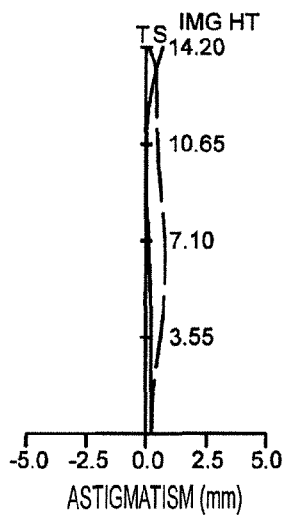
Figure 10C:
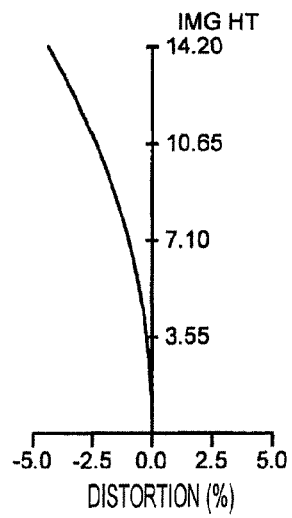
Figure 10D:
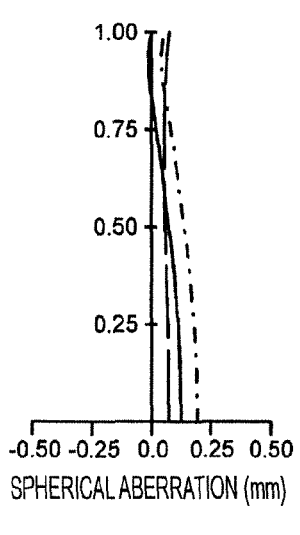
Figure 10E:
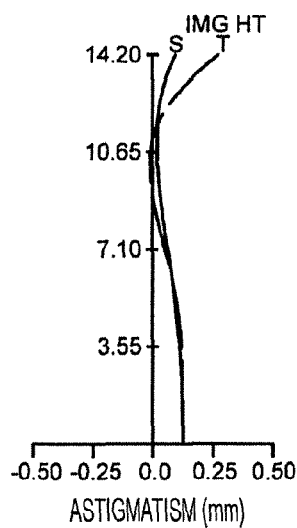
Figure 10F:
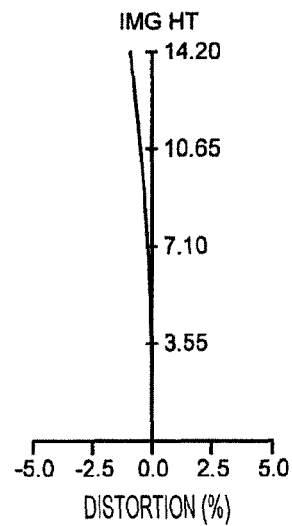
Figure 12A:
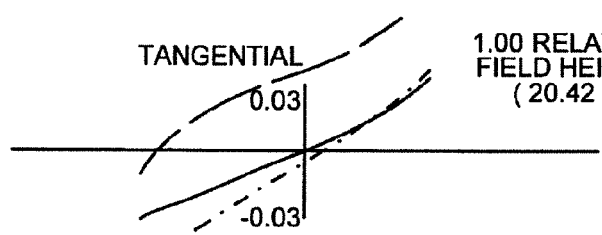
FIGS. 12A to 12J are lateral aberration graphs in a second focus position of Example 1.
Figure 12F:
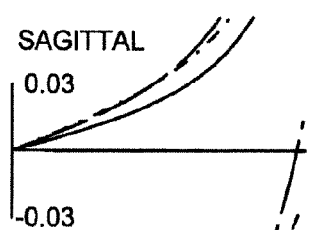
Figure 12B:
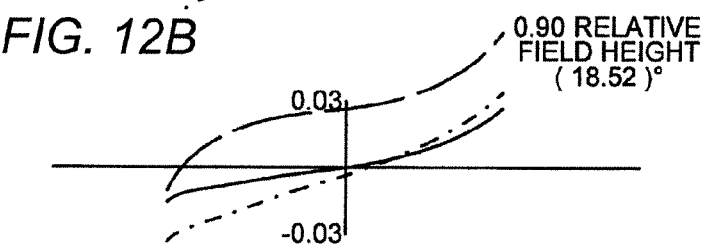
Figure 12G:
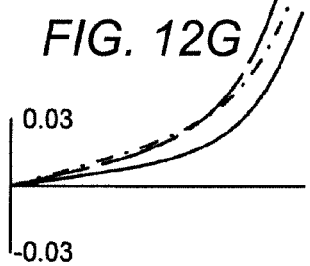
Figure 12C:
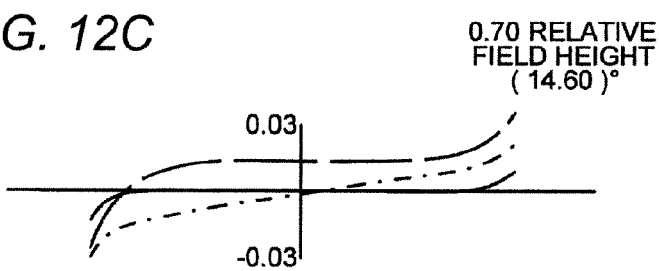
Figure 12H:
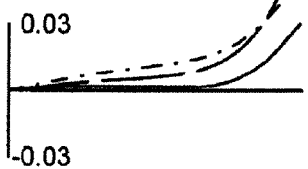
Figure 12D:
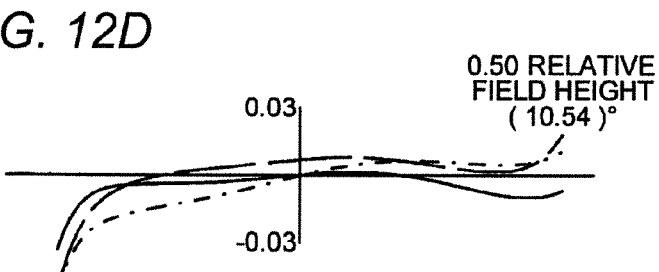
Figure 12I:
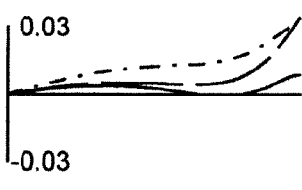
Figure 12E:
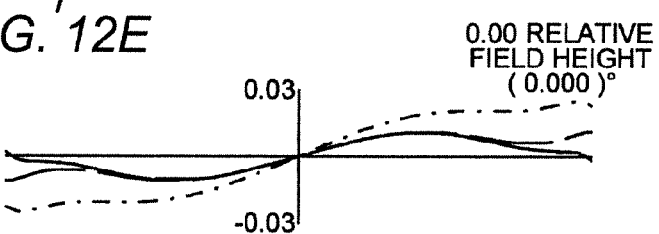
Figure 12J:
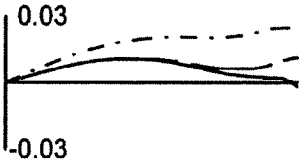
Figure 13A:
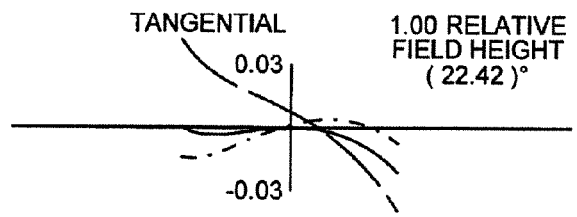
FIGS. 13A to 13J are lateral aberration graphs in the first focus position of Example 2.
Figure 13F:
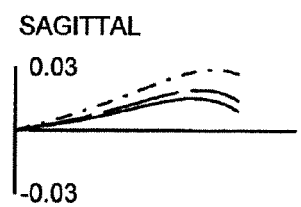
Figure 13B:
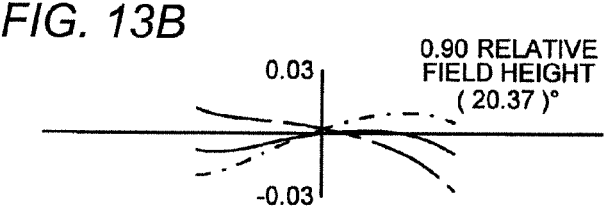
Figure 13G:
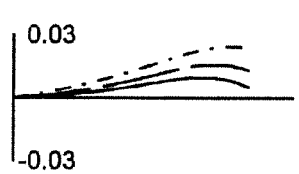
Figure 13C:
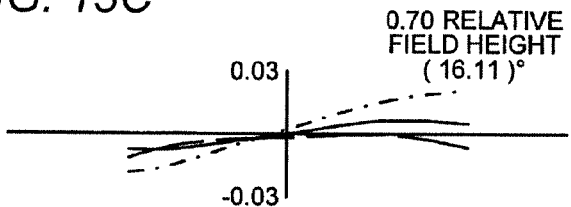
Figure 13H:
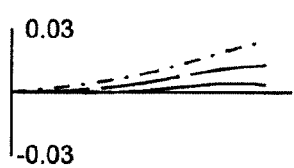
Figure 13D:
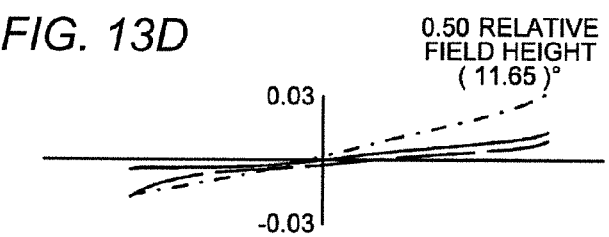
Figure 13I:
Figure 13E:
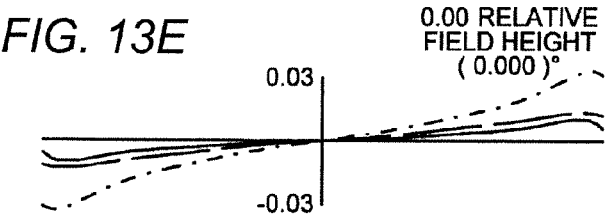
Figure 13J:
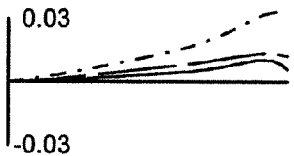
Figure 17A:
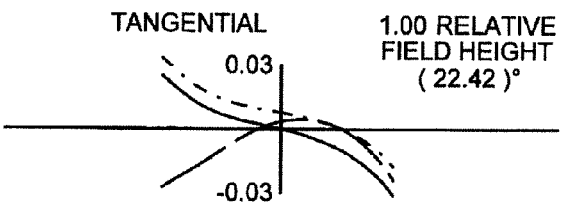
FIGS. 17A to 17J are lateral aberration graphs in the first focus position of Example 4.
Figure 17F:
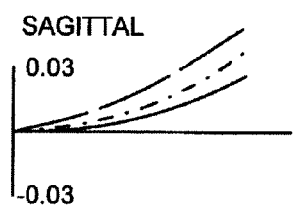
Figure 17B:
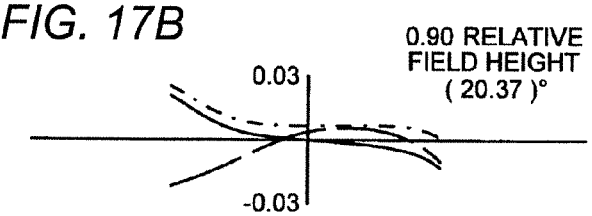
Figure 17G:
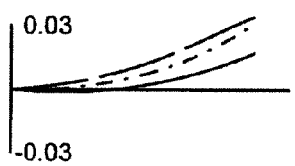
Figure 17C:
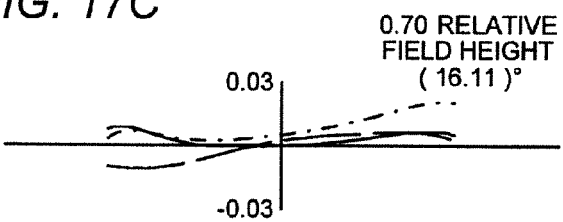
Figure 17H:
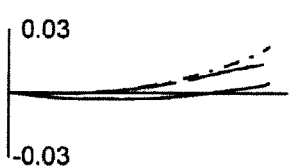
Figure 17D:
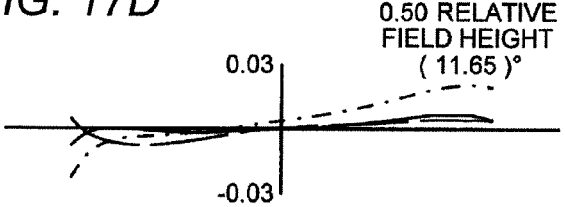
Figure 17I:
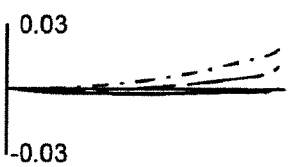
Figure 17E:
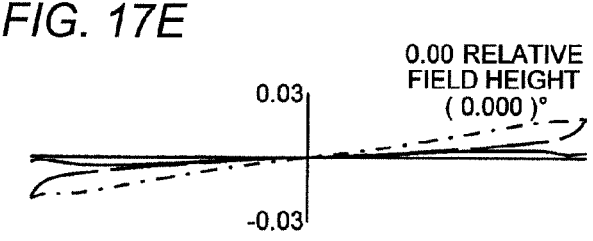
Figure 17J:
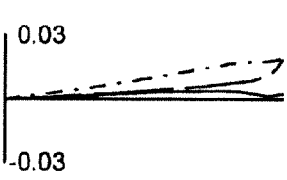
Figure 20A:
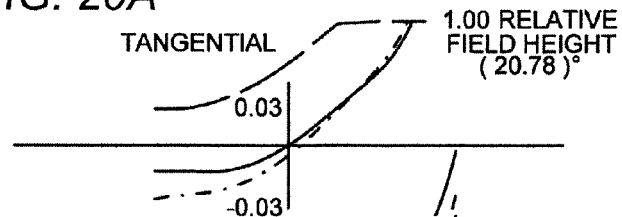
FIGS. 20A to 20J are lateral aberration graphs in the second focus position of Example 5.
Figure 20F:
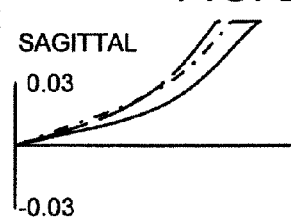
Figure 20B:
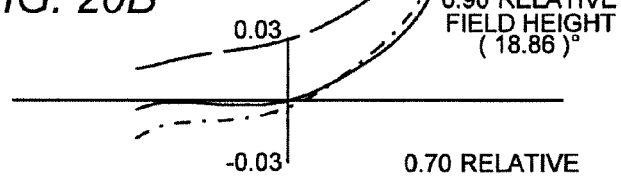
Figure 20G:
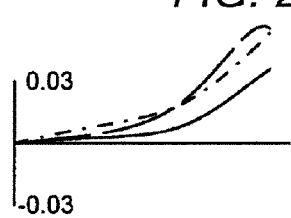
Figure 20C:
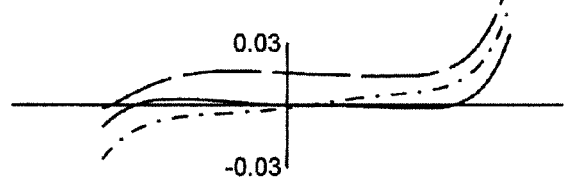
Figure 20H:
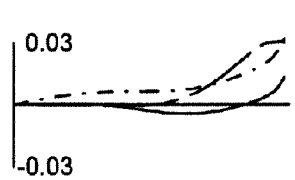
Figure 20D:
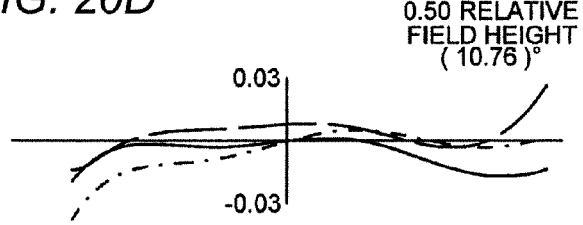
Figure 20I:
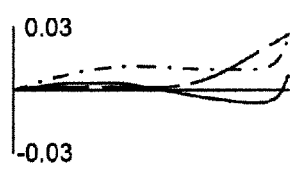
Figure 20E:
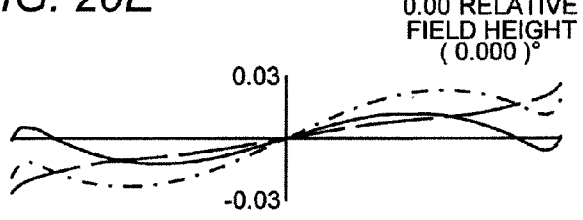
Figure 20J:
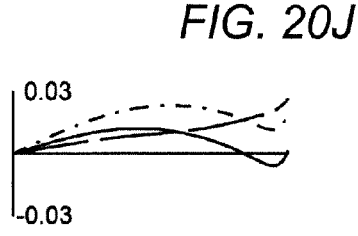

Hereinafter, embodiments of an imaging optical system, an imaging optical device, and a digital apparatus according to the present invention will be described with reference to the drawings. However, the scope of the invention is not limited to the illustrated examples.

An imaging optical system according to an embodiment of the present invention includes a first lens group of positive lenses, a second lens group of negative lenses, and a third lens group of positive lenses in order from the object side. As the entire second lens group is moved along the optical axis toward the image side, focusing on a nearby object is performed, and the following conditional expressions (1) to (5) are satisfied:

$$0.8 < 1Gr\_Fl/FL < 1.2 \qquad (1)$$

$$0.6 < |2Gr\_Fl/FL| < 2.5 \qquad (2)$$

$$0.6 < 3Gr\_Fl/FL < 1.8 \quad (3)$$

$$0.8 < 1Gr\_R\_nop/1Gr\_Thi < 1.1 \quad (4)$$

$$-0.6 < 2Gr\_R\_nop/2Gr\_Thi < 1.6 \quad (5)$$

where

FL represents the focal length of the entire system,

1Gr_Fl represents the focal length of the first lens group,

2Gr_Fl represents the focal length of the second lens group,

3Gr_Fl represents the focal length of the third lens group,

1Gr_R_nop represents the distance from the outermost surface of the first lens group on the object side to the rear principal point of the first lens group, 1Gr_Thi represents the total length of the first lens group, 2Gr_R_nop represents the distance from the outermost surface of the second lens group on the object side to the rear principal point of the second lens group, and 2Gr_Thi represents the total length of the second lens group.

Compared with a fully-moving type that performs focusing by moving an entire imaging optical system, an inner focus type can reduce the total weight of the lens group that moves at a time of focusing, because such an inner focus type has positive power, negative power, and positive power in order from the object side (power being an amount defined by a reciprocal of a focal length), and uses the second lens group having negative power as the focusing group. After a light flux converged by the first lens group is scattered by the second lens group, the light flux is again converged by the third lens group. In this manner, the incidence heights of the axial light flux and the off-axis light flux at the second lens group serving as the focusing group can be appropriately set. Therefore, employing the above described inner focus type is effective in reducing spherical aberration variation and coma aberration variation that are caused at a time of focusing and become problems particularly in a large-diameter lens.

The conditional expressions (1) to (3) specify the powers of the respective lens groups to shorten the total lens length. If the upper limit shown in the conditional expression (1) is exceeded, the power of the first lens group becomes weaker. As a result, the moving distance required for the second lens group in focusing becomes longer, and the spherical aberration variation that accompanies the focusing becomes larger. This also works unfavorably in shortening the total lens length. If the lower limit shown in the conditional expression (1) is not reached, the power of the first lens group becomes stronger, and the power of the second lens group inevitably becomes stronger too. As a result, it becomes difficult to correct the variation in coma aberration and the variation in astigmatism at the peripheral image height at a time of focusing.

If the upper limit shown in the conditional expression (2) is exceeded, the power of the second lens group becomes weaker. As a result, the moving distance required for the second lens group in focusing becomes longer, and the spherical aberration variation that accompanies the focusing becomes larger. If the lower limit shown in the conditional expression (2) is not reached, the power of the second lens group becomes stronger, and the peripheral light flux is subjected to a strong scattering effect. As a result, it becomes difficult to correct the variation in coma aberration and the variation in astigmatism at the peripheral image height at a time of focusing.

If the upper limit shown in the conditional expression (3) is exceeded, the power of the third lens group becomes weaker. Therefore, to obtain a large diameter, the light flux exiting the first lens group should be converged more strongly and be then released. As a result, the incidence height of the light flux entering the second lens group varies greatly at a time of focusing, and the variation in aberration due to focusing becomes larger. Also, the effective optical diameter of the second lens group becomes larger, which works unfavorably in reducing the weight of the focusing group. If the lower limit shown in the conditional expression (3) is not reached, the power of the third lens group becomes stronger. Therefore, it becomes difficult to correct the astigmatism at the peripheral field angle. Since it is necessary to secure a space between the second lens group and the third lens group at a time of infinite-distance focusing, it is also difficult to shorten the total lens length.

The conditional expression (4) specifies the position of the rear principal point of the first lens group. If the lower limit shown in the conditional expression (4) is not reached, the distance from the rear principal point of the first lens group to the second lens group becomes longer, and the incidence position of the light flux entering the second lens group becomes lower. As a result, the spherical aberration cannot be appropriately corrected. If the upper limit shown in the conditional expression (4) is exceeded, the distance from the rear principal point of the first lens group to the second lens group becomes shorter. As a result, the scattering effect acting on the light flux at the peripheral image height at the second lens group becomes smaller, and it becomes difficult to correct the coma aberration. Since the effective optical diameter of the second lens group becomes larger, it also becomes difficult to reduce the weight of the focusing group.

The conditional expression (5) specifies the position of the rear principal point of the second lens group. If the lower limit shown in the conditional expression (5) is not reached, the distance from the rear principal point of the second lens group to the third lens group becomes longer, and the incidence position of the axial light flux entering the third lens group becomes lower. As a result, it becomes difficult to correct the spherical aberration. If the lower limit shown in the conditional expression (5) is not reached, the distance from the rear principal point of the second lens group to the third lens group becomes shorter, and the axial light flux and the off-axis light flux are not clearly separated from each other on the third lens group. As a result, it becomes difficult to correct the field curvature.

With the above described features, an imaging optical system of an inner focus type that includes a first lens group of positive lenses, a second lens group of negative lenses, and a third lens group of positive lenses in order from the object side, and moves the second lens group toward the image side at a time of performing focusing on a nearby object from infinity can be made a compact and high-performance imaging optical system that has a large diameter and includes a lightweight focusing group, having a structure that appropriately satisfies effective conditions for reducing the weight of the focusing group. Also, an imaging optical device equipped with the imaging optical system can be realized. For example, it is possible to obtain an imaging optical system that is a large-diameter standard lens that has a shorter total lens length and smaller variation in performance at a time of focusing, and can effectively cope with contrast AF by virtue of the reduced weight of the focusing group.

If such a high-performance and high-function imaging optical system or imaging optical device is used in a digital apparatus such as a digital camera, a sophisticated image input function can be added to the digital apparatus in a lightweight and compact fashion, and it is possible to reduce the size and the costs of the digital apparatus, and enhance the performance and the functions of the digital apparatus. Also, an imaging optical system according to an embodiment of the present invention is suitable as an interchangeable lens for a mirrorless interchangeable lens digital camera. Accordingly, a lightweight and small-sized interchangeable lens that is handy to carry around can be realized. The conditions and the like for achieving these effects in a balanced manner, obtaining higher optical performance, and reducing weight and size are described below.

The stop is preferably placed between the first lens group and the second lens group. As the stop is placed between the first lens group and the second lens group, the incidence position of the off-axis light flux entering the second lens group does not become too high, and the variation in coma aberration due to focusing can be reduced.

The following conditional expression (6) is preferably satisfied:

$$2.0 < \beta\_2Gr/\beta\_3Gr < 12.0 \qquad (6)$$

where $\beta\_2Gr$ represents the lateral magnification of the second lens group when the object distance is infinite, and $\beta\_3Gr$ represents the lateral magnification of the third lens group when the object distance is infinite.

The conditional expression (6) specifies the imaging magnification ratio between the second lens group and the third lens group at a time of infinite focusing. If the upper limit shown in the conditional expression (6) is exceeded, the negative power of the second lens group becomes larger, and the off-axis light flux is strongly scattered at the second lens group. As a result, it becomes difficult to correct the coma aberration. If the lower limit shown in the conditional expression (6) is not reached, the negative power of the second lens group becomes smaller, and the moving distance required for the second lens group in focusing becomes longer. As a result, it becomes difficult to correct the variation in spherical aberration and the variation in chromatic aberration that occur at a time of focusing.

The first lens group includes a front group and a rear group in order from the object side, the lens closest to the image side in the front group has a concave surface facing the image side, the lens closest to the object side in the rear group has a concave surface facing the object side, the axial spacing between the front group and the rear group is the largest among the axial spacings in the first lens group, and the following conditional expressions (7) and (8) are preferably satisfied:

$$-0.2 < FL/1aGr\_Fl < 0.3 \qquad (7)$$

$$0.6 < 1bGr\_Fl/FL < 1.0 \qquad (8)$$

where $1aGr\_Fl$ represents the focal length of the front group, and $1bGr\_Fl$ represents the focal length of the rear group.

The front group and the rear group that are partial groups in the first lens group are preferably arranged so that concave surfaces face each other. With such arrangement, it is possible to realize an imaging optical system that has coma aberration suitable corrected, though having a large diameter. Also, as the conditional expressions (7) and (8) that specify the focal lengths of the front group and the rear group are satisfied, spherical aberration and coma aberration can be appropriately corrected while the effective diameter of the second lens group is shortened.

If the upper limit shown in the conditional expression (7) is exceeded, the positive power of the front group becomes too strong, and the coma aberration in the first lens group increases. At the same time, the distance from the rear principal point of the first lens group to the second lens group becomes longer, and the incidence position of the axial light flux entering the second lens group becomes lower. As a result, it becomes difficult to correct the spherical aberration. If the lower limit shown in the conditional expression (7) is not reached, the negative power of the front group becomes too strong, and the distance from the rear principal point of the first lens group to the second lens group becomes shorter. As a result, the scattering effect acting on the light flux at the peripheral image height at the second lens group becomes smaller, and it becomes difficult to correct the coma aberration. Since the effective diameter of the second lens group needs to be made longer, it also becomes difficult to reduce the weight of the focusing group.

For example, in a lens system disclosed in JP 2013-3324 A, the corresponding value in the conditional expression (7) is smaller than the lower limit shown in the conditional expression (7). That is, in the lens system disclosed in JP 2013-3324 A, the position of the rear principal point is near the second lens group. Therefore, there is not only the problem with the coma aberration properties described above, but also the need to increase the effective diameter of the second lens group. As a result, there is a risk of an increase in the weight of the focusing group.

If the upper limit shown in the conditional expression (8) is exceeded, the positive power of the rear group becomes too weak, and the coma aberration correction in the first lens group becomes insufficient. If the lower limit shown in the conditional expression (8) is not reached, the positive power of the rear group becomes stronger, and a strongly-converged light flux enters the second lens group. As a result, it becomes difficult to correct the spherical aberration variation that occurs at a time of focusing. Furthermore, the angle of the principal ray of the off-axis light flux exiting the first lens group becomes greater. Therefore, the effective diameter of the second lens group needs to be made larger as the coma aberration increases. As a result, it also becomes difficult to reduce the weight of the focusing group.

The first lens group includes at least one aspherical lens, and the aspherical lens has an aspherical shape on the object side, the curvature radius of the aspherical shape being smaller at a longer distance from the optical axis. As the aspherical lens having an aspherical shape with a curvature radius that is smaller (or the power of the surface becomes weaker) at a longer distance from the optical axis is placed in the first lens group, the astigmatism that occurs with the off-axis light flux is effectively corrected. Particularly, an even greater effect can be expected, if a convex surface facing the object has the aspherical shape.

The third lens group preferably includes a positive power lens and a negative power lens. As the third lens group includes a positive lens and a negative lens, the coma aberration of the off-axis light flux can be effectively corrected. Furthermore, if the positive lens and the negative lens are arranged in this order from the object side, the aberration correction effect can be made even greater. Also, if the third lens group includes a positive lens having an aspherical shape, the astigmatism can be more effectively corrected.

In an imaging optical system for forming an optical image of an object on the imaging surface of an imaging element, when half the diagonal length of the screen size of the imaging surface is set as the maximum image height, the following conditional expression (9) is preferably satisfied:

$$4.0 < TL/(FL \times \tan \omega) < 6.5 \qquad (9)$$

where

TL represents the total length of the entire system (the distance from the vertex of the lens surface closest to the object side to the imaging surface), and ω represents the maximum half field angle.

The conditional expression (9) specifies the total lens length with respect to the field angle of an imaging optical system according to an embodiment of the present invention, and sets appropriately-balanced conditions so as to shorten the total lens length, reduce the weight of the focusing group, and restrain variation in performance at times of focusing. If the conditional expressions (1) to (5) are also satisfied in the imaging optical system that satisfies the conditional expression (9), the total lens length can be shortened, the weight of the focusing group can be reduced, and the focus performance can be improved. These three effects can be effectively achieved at the same time.

The following conditional expression (10) is preferably satisfied:

$$W\_2Gr<25 \quad (10)$$

where

W_2Gr represents the total weight (g) of the lens components constituting the second lens group.

The conditional expression (10) specifies the total weight of the lens components constituting the second lens group, and sets appropriately-balanced conditions so as to reduce the weight of the focusing group and restrain variation in performance at times of focusing. When the conditional expression (10) is satisfied, high-speed focusing can be realized, as the weight of the focusing group is reduced. However, satisfying the above mentioned conditional expression (2) or the like is also effective in reducing the weight of the focusing group.

In an imaging optical system for forming an optical image of an object on the imaging surface of an imaging element, when half the diagonal length of the screen size of the imaging surface is set as the maximum image height, the following conditional expression (11) is preferably satisfied:

$$40<2\omega<50 \quad (11)$$

where

ω represents a maximum half field angle.

The conditional expression (11) specifies the field angle of an imaging optical system according to an embodiment of the present invention, and sets appropriately-balanced conditions so as to reduce the weight of the focusing group and restrain variation in performance at times of focusing. When the conditional expression (11), the field angle of a so-called standard lens can be obtained. If the conditional expressions (1) to (5) are also satisfied in the imaging optical system that has a field angle satisfying the conditional expression (11), the weight of the focusing group can be reduced, and the focus performance can be improved. These two effects can be effectively achieved at the same time.

An imaging optical system according to an embodiment of the present invention is suitable as an imaging lens for a digital apparatus (such as a digital camera) having an image input function. When such an imaging optical system is combined with an imaging element or the like, an imaging optical device that optically captures a video image of an object and outputs the video image as an electrical signal can be formed. Such an imaging optical device is an optical device that serves as a principal component of a camera to be used in taking a still image or a moving image of an object, and includes, in order from the object side, an imaging optical system that forms an optical image of an object, and an imaging element that converts the optical image formed by the imaging optical system into an electrical signal, for example. The imaging optical system that has the above described characteristic structure is positioned so that an optical image of an object is formed on the light receiving surface (or the imaging surface) of the imaging element. With this arrangement, it is possible to realize an imaging optical device that is small in size and exhibits high performance at low costs, and a digital apparatus including the imaging optical device.

Examples of such digital apparatuses having an image input function include a digital camera, a video camera, a surveillance camera, a security camera, an on-vehicle camera, and a camera for a videophone. Other examples include a personal computer, a portable digital apparatus (such as a portable telephone, a smartphone (a portable telephone with sophisticated functions), a tablet terminal, or a mobile computer), a peripheral device (such as a scanner, a printer, or a mouse) for such digital apparatuses, and some other digital apparatus (such as a drive recorder or a defense apparatus) having an internal or external camera function. As can be seen from these examples, a camera is formed by using an imaging optical device, and a camera function can be added to an apparatus by mounting an imaging optical device in the apparatus. For example, it is possible to form a digital apparatus having an image input function, such as a camera-equipped portable telephone.

Figure 21:
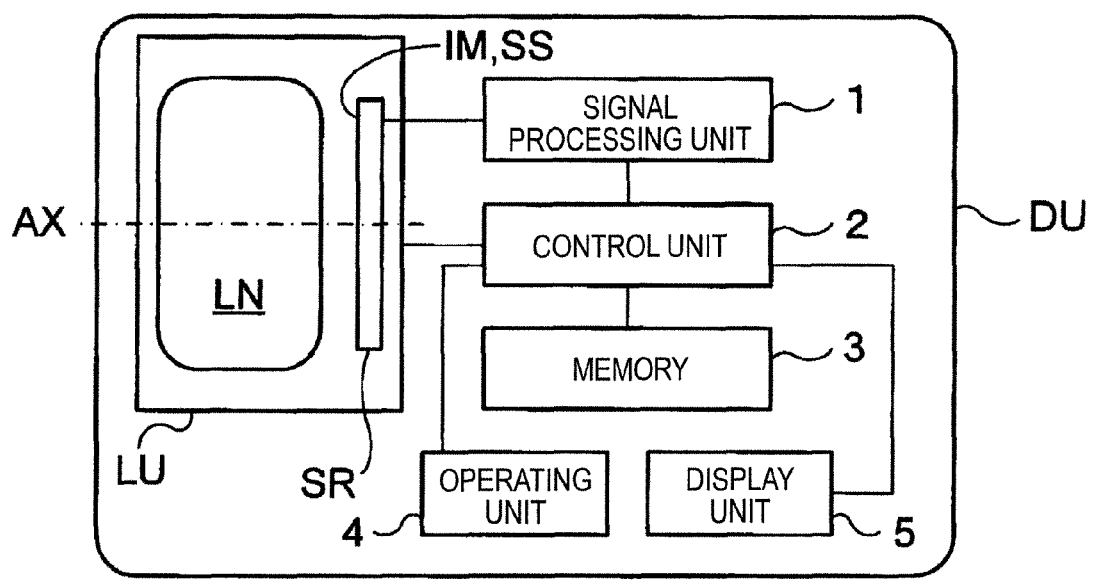
FIG. 21 is a schematic diagram showing an example structure of a digital apparatus equipped with an imaging optical device.

FIG. 21 is a schematic cross-sectional view of an example structure of a digital apparatus DU as an example digital apparatus having an image input function. The imaging optical device LU mounted in the digital apparatus DU shown in FIG. 21 includes, in order from the object side, an imaging optical system LN that forms an optical image (an image surface) IM of an object (AX representing the optical axis), and an imaging element SR that converts the optical image IM formed on the light receiving surface (the imaging surface) SS by the imaging optical system LN into an electrical signal. A plane-parallel plate (equivalent to the cover glass for the imaging element SR, and an optical filter such as an optical low-pass filter or an infrared cutoff filter that is provided if necessary) is also provided as necessary. In a case where the digital apparatus DU having an image input function includes this imaging optical device LU, the imaging optical device LU is normally placed in the main body. However, so as to realize a camera function, an appropriate structure can be employed as necessary. For example, the imaging optical device LU designed as a unit can be detachably or rotatably attached to the main body of the digital apparatus DU.

The imaging optical system LN is a standard lens formed with three or more groups including a positive lens group, a negative lens group, and another positive lens group on the object side. The imaging optical system LN performs focusing on a nearby object by moving the entire second lens group along the optical axis AX toward the image side, and forms the optical image IM on the light receiving surface SS of the imaging element SR. The imaging element SR is a solid-state imaging element having more than one pixel, such as a CCD image sensor or a CMOS image sensor. The imaging optical system LN is positioned so that the optical image IM of the object is formed on the light receiving surface SS, which is the photoelectric conversion portion of the imaging element SR. Accordingly, the optical image IN formed by the imaging optical system LN is converted into an electrical signal by the imaging element SR.

The digital apparatus DU includes a signal processing unit 1, a control unit 2, a memory 3, an operating unit 4, and a display unit 5, as well as the imaging optical device LU. A signal generated at the imaging element SR is subjected to predetermined digital image processing, image compression, or the like at the signal processing unit 1 as necessary, and is recorded as a digital video signal into the memory 3 (a semiconductor memory, an optical disk, or the like). In some cases, such a signal is transmitted to another apparatus via a cable, or is converted into an infrared signal or the like and is then transmitted to another apparatus (the communication function of a portable telephone, for example). The control unit 2 is formed with a microcomputer. The control unit 2 collectively controls functions such as imaging functions (a still image capturing function, a moving image capturing function, and the like) and an image reproducing function, and controls the lens movement mechanism for focusing, image stabilization, and the like. For example, the control unit 2 controls the imaging optical device LU to capture a still image and/or a moving image of an object. The display unit 5 is a component that includes a display such as a liquid crystal monitor, and displays an image, using an image signal converted by the imaging element SR or image information recorded in the memory 3. The operating unit 4 is a component that includes operating portions such as operating buttons (a release button, for example) and an operating dial (an imaging mode dial, for example), and transfers information that is input by an operator, to the control unit 2.

Next, the optical structure of the imaging optical system LN is described in greater detail by way of first to fifth embodiments of the imaging optical system LN. FIGS. 1 to 5 are lens structure diagrams corresponding to the respective imaging optical systems LN forming the first to fifth embodiments, and each show the lens arrangement in a first focus position POS1 (in an object infinity state) in optical cross-section. At a time of focusing, a second lens group Gr2 moves along an optical axis AX. That is, the second lens group Gr2 is a focusing group, and moves toward the image side at a time of focusing on a nearby object, as indicated by an arrow mF.

Each of the imaging optical systems LN forming the first to fifth embodiments is a standard lens formed with three lens groups that are a positive lens group, a negative lens group, and another positive lens group, the second lens group Gr2 being the focusing group. A first lens group Gr1 includes a front group Gr1a and a rear group Gr1b in order from the object side. The front group Gr1a and the rear group Gr1b are arranged so that the concave surfaces face each other, and the axial spacing between the front group Gr1a and the rear group Gr1b is the largest among the axial spacing in the first lens group Gr1. A stop ST is placed between the first lens group Gr1 and the second lens group Gr2. As the stop ST is placed between the first and second lens groups Gr1 and Gr2, the coma aberration that occurs in each lens group can be corrected in a preferred manner. A plane-parallel plate PT is placed between the imaging optical system LN and an image surface IM, and this plane-parallel plate PT is a flat glass plate having a thickness equivalent to the total optical thickness of the cover glass of an imaging element SR and a low-pass filter for preventing moire.

In the imaging optical system LN of the first embodiment (FIG. 1), the respective lens groups are designed as described below in order from the object side. The front group Gr1a in the first lens group Gr1 includes: a cemented lens formed with a negative meniscus lens L11 having its convex surface facing the object side and a positive meniscus lens L12 having its convex surface facing the object side; and a negative meniscus lens L13 that has its convex surface facing the object side and has two aspherical surfaces. The rear group Gr1b in the first lens group Gr1 includes: a cemented lens formed with a biconcave lens L14 and a biconvex lens L15; and a biconvex lens L16. The lens L13 closest to the image side in the front group Gr1a has its concave surface facing the image side, and the lens L14 closest to the object side in the rear group Gr1b has its concave surface facing the object side. The second lens group Gr2 includes a biconcave lens L21 and a biconvex lens L22. The third lens group Gr3 includes a biconvex lens L31 having two aspherical surfaces, and a biconcave lens L32.

In the imaging optical system LN of the second embodiment (FIG. 2), the respective lens groups are designed as described below in order from the object side. The front group Gr1a in the first lens group Gr1 includes: a cemented lens formed with a negative meniscus lens L11 having its convex surface facing the object side and a positive meniscus lens L12 having its convex surface facing the object side; and a negative meniscus lens L13 that has its convex surface facing the object side and has two aspherical surfaces. The rear group Gr1b in the first lens group Gr1 includes: a cemented lens formed with a biconcave lens L14 and a biconvex lens L15; and a biconvex lens L16. The lens L13 closest to the image side in the front group Gr1a has its concave surface facing the image side, and the lens L14 closest to the object side in the rear group Gr1b has its concave surface facing the object side. The second lens group Gr2 includes a biconcave lens L21 and a biconvex lens L22. The third lens group Gr3 includes a biconvex lens L31 having two aspherical surfaces, and a biconcave lens L32.

In the imaging optical system LN of the third embodiment (FIG. 3), the respective lens groups are designed as described below in order from the object side. The front group Gr1a in the first lens group Gr1 includes: a positive meniscus lens L11 having its convex surface facing the object side; and a negative meniscus lens L12 that has its convex surface facing the object side and has two aspherical surfaces. The rear group Gr1b in the first lens group Gr1 includes: a cemented lens formed with a biconcave lens L13 and a biconvex lens L14; and a biconvex lens L15. The lens L12 closest to the image side in the front group Gr1a has its concave surface facing the image side, and the lens L13 closest to the object side in the rear group Gr1b has its concave surface facing the object side. The second lens group Gr2 includes: a cemented lens formed with a biconvex lens L21 and a biconcave lens L22; and a negative meniscus lens L23 having its concave surface facing the object side. The third lens group Gr3 includes a biconvex lens L31 having two aspherical surfaces, and a negative meniscus lens L32 having its concave surface facing the object side.

In the imaging optical system LN of the fourth embodiment (FIG. 4), the respective lens groups are designed as described below in order from the object side. The front group Gr1a in the first lens group Gr1 includes a negative meniscus lens L11 having its convex surface facing the object side, a positive meniscus lens L12 having its convex surface facing the object side, and a negative meniscus lens L13 having its convex surface facing the object side. The rear group Gr1b in the first lens group Gr1 includes: a cemented lens formed with a biconcave lens L14 and a biconvex lens L15; and a biconvex lens L16 having two aspherical surfaces. The lens L13 closest to the image side in the front group Gr1a has its concave surface facing the image side, and the lens L14 closest to the object side in the rear group Gr1b has its concave surface facing the object side. The second lens group Gr2 includes a negative meniscus lens L21 that has its convex surface facing the object side and has two aspherical surfaces. The third lens group Gr3 includes: a cemented lens formed with a negative meniscus lens L31 having its convex surface facing the object side and a biconvex lens L32; and a negative meniscus lens L33 having its convex surface facing the object side.

In the imaging optical system LN of the fifth embodiment (FIG. 5), the respective lens groups are designed as described below in order from the object side. The front group Gr1a in the first lens group Gr1 includes: a negative meniscus lens L11 having its convex surface facing the object side; a biconvex lens L12; and a negative meniscus lens L13 that has its convex surface facing the object side and has two aspherical surfaces. The rear group Gr1b in the first lens group Gr1 includes: a cemented lens formed with a biconcave lens L14 and a biconvex lens L15; and a biconvex lens L16. The lens L13 closest to the image side in the front group Gr1a has its concave surface facing the image side, and the lens L14 closest to the object side in the rear group Gr1b has its concave surface facing the object side. The second lens group Gr2 includes a negative meniscus lens L21 having its convex surface facing the object side. The third lens group Gr3 includes: a cemented lens formed with a negative meniscus lens L31 having its convex surface facing the object side and a biconvex lens L32; and a negative meniscus lens L33 that has its concave surface facing the object side and has two aspherical surfaces.

Each of the object-side surfaces of the negative meniscus lenses L13 (FIGS. 1, 2, and 5), L12 (FIG. 3), and L16 (FIG. 4) in the first lens groups Gr1 has an aspherical shape, the curvature radius thereof being smaller at a longer distance from the optical axis AX. Having an aspherical surface that has a smaller curvature radius at a longer distance from the optical axis AX in the first lens group Gr1 is effective in correcting the astigmatism that occurs with an off-axis light flux. A particularly greater effect can be expected by forming the above described aspherical shape with a surface that is a convex surface facing the object side.

In each of the first and second embodiments (FIGS. 1 and 2), the second lens group Gr2 includes a negative lens L21 and a positive lens L22. In the third embodiment (FIG. 3), the second lens group Gr2 includes negative lenses L22 and L23, and a positive lens L21. As the second lens group Gr2 includes a negative lens and a positive lens, or more preferably, the second lens group Gr2 has a negative lens and a positive lens arranged in order from the object side, the field curvature and the chromatic aberration that vary at a time of focusing can be corrected in a preferred manner.

In each of the first to third embodiments (FIGS. 1 to 3), the third lens group Gr3 includes a positive lens and a negative lens in this order. In each of the fourth and fifth embodiments (FIGS. 4 and 5), the third lens group Gr3 includes a positive-power cemented lens and a negative lens in this order. As a positive lens and a negative lens are provided in reverse order in the third lens group Gr3, the coma aberration that occurs in the first and second lens groups Gr1 and Gr2 can be corrected, and the total lens length can be effectively shortened. Furthermore, as the focal length of the third lens group Gr3 is made longer than the focal length of the first lens group Gr1, the moving distance of the second lens group Gr2 required for focusing can be reduced. Accordingly, fluctuations in aberration due to focusing can be effectively prevented, and the total lens length can be effectively shortened.

In each of the first to third embodiments (FIGS. 1 to 3), the third lens group Gr3 includes a positive biconvex lens L31 having an aspherical shape. Accordingly, astigmatism can be even more effectively corrected.

EXAMPLES

In the following, the structures and the like of imaging optical systems embodying the present invention are described in greater detail by way of the construction data and the like of Examples. Examples 1 to 5 (EX1 to EX5) described herein are numerical examples corresponding to the above described first to fifth embodiments, respectively, and the lens structure diagrams (FIGS. 1 to 5) showing the first to fifth embodiments show the optical structures of Examples 1 to 5, respectively.

The construction data of each Example shows, as planar data, surface numbers i (OB: object surface, ST: stop surface, IM: image surface), curvature radii r (mm), axial surface spacings d (mm), refractive indexes nd with respect to the d line (587.56 nm in wavelength), Abbe numbers vd with respect to the d line, and effective radii R (mm), in order from the leftmost column. Each surface with a surface number i having "★" attached thereto is an aspherical surface, and the surface shape thereof is defined by the expression (AS) shown below using a local orthogonal coordinate system (x, y, z) having the surface vertex as the origin. Aspherical coefficients and the like are shown as aspherical data. The coefficient of each item with no aspherical data in each Example is 0, and E−n=×10$^{-n}$ is satisfied in all of the data.

$$z=(c \cdot h^2)/[1+\sqrt{\{1-(1+K) \cdot c^2 \cdot h^2\}}]+\Sigma(Aj \cdot h^j) \quad \text{(AS)}$$

where h represents the height ($h^2=x^2+y^2$) in a direction perpendicular to the z-axis (optical axis AX), z represents the sag in the direction of the optical axis AX at the height h (with respect to the surface vertex), c represents the curvature at the surface vertex (the reciprocal of the curvature radius r), K represents the conic constant, and Aj represents the jth aspherical coefficient.

Other various data shows the entire system's focal length FL (mm), the F-number (FNO), the full field angle 2ω (°), and the total lens length TL (the distance (mm) from the foremost lens surface to the image surface IM). Further, the stop diameters (effective radii R) and the variable axial surface spacings di (i: surface numbers) in first and second focus positions POS1 and POS2 are shown as variable parameters that vary with focusing. Also, Table 1 shows the corresponding values in the conditional expressions and the related data of the respective Examples.

FIGS. 6A to 10F are longitudinal aberration graphs corresponding to Examples 1 to 5 (EX1 to EX5), respectively. FIGS. 6A to 6C, 7A to 7C, 8A to 8C, 9A to 9C, and 10A to 10C show aberrations in the first focus position POS1. FIGS. 6D to 6F, 7D to 7F, 8D to 8F, 9D to 9F, and 10D to 10F show aberrations in the second focus position POS2. FIGS. 6A and 6D, 7A and 7D, 8A and 8D, 9A and 9D, and 10A and 10D are spherical aberration graphs. FIGS. 6B and 6E, 7B and 7E, 8B and 8E, 9B and 9E, and 10E and 10E are astigmatism graphs. FIGS. 6C and 6F, 7C and 7F, 8C and 8F, 9C and 9F, and 10C and 10F are distortion graphs. Each spherical aberration graph shows the spherical aberration with respect to the d line (587.56 nm in wavelength) represented by a solid line, the spherical aberration with respect to the C line (656.28 nm in wavelength) represented by a dot-and-dash line, and the spherical aberration with respect to the g line (435.84 nm in wavelength) in the form of shift lengths (unit: mm) in the direction of the optical axis AX from the paraxial image surface. In each spherical aberration graph, the ordinate axis indicates the value (or the relative eye height) obtained by standardizing the height of light incident on the eye with the maximum height. In each astigmatism graph, the dashed line T represents the tangential image surface with respect to the d line in the form of a shift length (unit: mm) in the direction of the optical axis AX from the paraxial image surface, the solid line S represents a sagittal image surface in the form of a shift length (unit: mm) in the direction of the optical axis AX from the paraxial image surface, and the ordinate axis indicates the image height (IMG HT, unit: mm). In each distortion graph, the abscissa axis indicates the distortion (unit: %) with respect to the d line, and the ordinate axis indicates the image height (IMG HT, unit: mm). The maximum value of the image height IMG HT is equivalent to the maximum image height Y' in the image surface IM (half the diagonal length of the light receiving surface SS of the imaging element SR).

FIGS. 11A to 11J, 12A to 12J, 13A to 13J, 14A to 14J, 15A to 15J, 16A to 16J, 17A to 17J, 18A to 18J, 19A to 19J, and 20A to 20J are lateral aberration graphs corresponding to Examples 1 to 5 (EX1 to EX5), showing lateral aberrations (mm) in the first and second focus positions POS1 and POS2. FIGS. 11A to 11E, 12A to 12E, 13A to 13E, 14A to 14E, 15A to 15E, 16A to 16E, 17A to 17E, 18A to 18E, 19A to 19E, and 20A to 20E show the lateral aberrations with tangential fluxes of light, and FIGS. 11F to 11J, 12F to 12J, 13F to 13J, 14F to 14J, 15F to 15J, 16F to 16J, 17F to 17J, 18F to 18J, 19F to 19J, and 20F to 20J show the lateral aberrations with sagittal fluxes of light. In each graph, lateral aberrations at the image height ratio (half field angle ω°) indicated as RELATIVE FIELD HEIGHT are shown with respect to the d line (587.56 nm in wavelength) represented by the solid line, the C line (656.28 nm in wavelength) represented by the dot-and-dash line, and the g line (435.84 nm in wavelength) represented by the dashed line. The image height ratio is the relative image height obtained by standardizing the image height with the maximum image height Y'.

Example 1

Unit: mm
Surface data

| i | r | d | nd | vd | R |
|---|---|---|----|----|---|
| OB | ∞ | variable | | | |
| 1 | 67.206 | 1.00 | 1.51680 | 64.20 | 15.480 |
| 2 | 19.951 | 6.92 | 1.88100 | 40.14 | 13.816 |
| 3 | 524.854 | 1.24 | | | 13.500 |
| *4 | 64.086 | 0.90 | 1.80860 | 40.42 | 11.000 |
| *5 | 18.021 | 7.39 | | | 10.000 |
| 6 | −19.918 | 0.90 | 1.74077 | 27.76 | 10.136 |
| 7 | 24.649 | 7.81 | 1.83481 | 42.72 | 12.312 |
| 8 | −25.959 | 0.20 | | | 12.633 |
| 9 | 42.120 | 4.32 | 1.72916 | 54.68 | 12.791 |
| 10 | −96.650 | 0.50 | | | 12.619 |
| 11(ST) | ∞ | variable | | | 12.203 |
| 12 | −81.281 | 0.90 | 1.61293 | 36.96 | 11.780 |
| 13 | 27.326 | 3.07 | | | 11.283 |
| 14 | 290.281 | 2.69 | 1.84666 | 23.78 | 11.373 |
| 15 | −70.508 | variable | | | 11.433 |
| *16 | 35.875 | 6.03 | 1.74320 | 49.30 | 11.200 |
| *17 | −31.635 | 3.20 | | | 11.344 |
| 18 | −136.084 | 0.90 | 1.84666 | 23.88 | 10.800 |
| 19 | 35.443 | 15.89 | | | 10.647 |
| 20 | ∞ | 1.50 | 1.51680 | 64.20 | 16.000 |
| 21 | ∞ | 0.80 | | | 16.000 |
| IM | ∞ | | | | |

Aspherical data

| i | 4 | 5 | 16 | 17 |
|---|---|---|----|----|
| K | 0 | 0 | 0 | 0 |
| A4 | −5.021E−06 | 1.432E−05 | −2.145E−06 | 1.364E−05 |
| A6 | −5.308E−08 | −3.053E−09 | −5.956E−09 | −1.582E−08 |
| A8 | 1.363E−10 | 3.580E−10 | 5.079E−11 | 6.274E−11 |
| A10 | −4.192E−13 | −3.205E−13 | 0.000E+00 | 0.000E+00 |
| A12 | 0.000E+00 | 0.000E+00 | 0.000E+00 | 0.000E+00 |

Other various data

| | |
|---|---|
| FL | 34.4 |
| FNO | 1.44 |
| 2ω | 44.9 |
| TL | 78.0 |

Variable parameters

| object distance | aperture stop diameter | d11 | d15 |
|---|---|---|---|
| ∞ (POS1) | 12.203 | 2.25 | 9.59 |
| 245 mm (POS2) | 12.203 | 10.34 | 1.50 |

Example 2

Unit: mm
Surface data

| i | r | d | nd | vd | R |
|---|---|---|----|----|---|
| OB | ∞ | variable | | | |
| 1 | 53.035 | 1.00 | 1.51680 | 64.20 | 14.517 |
| 2 | 18.037 | 7.03 | 1.91082 | 35.25 | 12.898 |
| 3 | 289.461 | 0.40 | | | 13.500 |
| *4 | 49.969 | 0.90 | 1.80860 | 40.42 | 10.600 |

-continued

| i | r | d | nd | vd | R |
|---|---|---|---|---|---|
| *5 | 15.572 | 7.51 | | | 10.000 |
| 6 | −21.693 | 0.90 | 1.76182 | 26.61 | 9.773 |
| 7 | 20.865 | 7.44 | 1.80420 | 46.50 | 11.719 |
| 8 | −28.950 | 0.20 | | | 12.033 |
| 9 | 39.069 | 4.96 | 1.72916 | 54.67 | 12.548 |
| 10 | −56.417 | 0.51 | | | 12.422 |
| 11(ST) | ∞ | variable | | | 11.783 |
| 12 | −81.647 | 0.90 | 1.58144 | 40.89 | 11.289 |
| 13 | 22.943 | 3.34 | | | 10.650 |
| 14 | 366.772 | 2.50 | 1.84666 | 23.78 | 10.708 |
| 15 | −72.811 | variable | | | 10.742 |
| *16 | 37.714 | 5.44 | 1.74320 | 49.30 | 11.000 |
| *17 | −28.132 | 2.64 | | | 11.151 |
| 18 | −83.441 | 0.90 | 1.71736 | 29.50 | 10.800 |
| 19 | 33.234 | 16.00 | | | 10.646 |
| 20 | ∞ | 1.50 | 1.52249 | 59.48 | 16.000 |
| 21 | ∞ | 0.81 | | | 16.000 |
| IM | ∞ | | | | |

Aspherical data

| i | 4 | 5 | 16 | 17 |
|---|---|---|---|---|
| K | 0 | 0 | 0 | 0 |
| A4 | −1.107E−05 | 9.680E−06 | −2.298E−06 | 1.545E−05 |
| A6 | −2.926E−08 | 1.808E−08 | −1.424E−09 | −1.461E−08 |
| A8 | 5.105E−12 | 3.056E−10 | 2.159E−11 | 4.199E−11 |
| A10 | 0.000E+00 | 0.000E+00 | 0.000E+00 | 0.000E+00 |
| A12 | 0.000E+00 | 0.000E+00 | 0.000E+00 | 0.000E+00 |

Other various data

| FL | 34.4 |
|---|---|
| FNO | 1.44 |
| 2ω | 44.9 |
| TL | 75.0 | variable parameters

| object distance | aperture stop diameter | d11 | d15 |
|---|---|---|---|
| ∞ (POS1) | 11.783 | 2.25 | 7.88 |
| 245 mm (POS2) | 8.211 | 8.63 | 1.50 |

Example 3

Unit: mm
Surface data

| i | r | d | nd | vd | R |
|---|---|---|---|---|---|
| OB | ∞ | variable | | | |
| 1 | 37.720 | 4.47 | 2.00069 | 25.46 | 16.926 |
| 2 | 119.240 | 4.42 | | | 16.211 |
| 3 | 23.929 | 0.90 | 1.80860 | 40.41 | 10.800 |
| *4 | 14.463 | 8.14 | | | 9.910 |
| *5 | −21.578 | 0.90 | 1.78472 | 25.72 | 9.972 |
| 6 | 20.811 | 8.82 | 1.88100 | 40.14 | 11.650 |
| 7 | −29.126 | 0.20 | | | 12.138 |
| 8 | 38.714 | 3.99 | 1.88100 | 40.14 | 11.923 |
| 9 | −112.643 | 0.50 | | | 11.667 |
| 10(ST) | ∞ | variable | | | 11.166 |
| 11 | 45.871 | 2.50 | 1.88300 | 40.81 | 10.125 |
| 12 | −86.286 | 0.90 | 1.69895 | 30.05 | 9.910 |
| 13 | 15.460 | 6.42 | | | 8.620 |
| 14 | −17.044 | 0.90 | 1.51823 | 58.96 | 8.577 |
| 15 | −29.870 | variable | | | 8.900 |
| *16 | 61.910 | 6.32 | 1.85400 | 40.39 | 11.500 |
| *17 | −21.612 | 1.36 | | | 11.843 |
| 18 | −24.627 | 0.90 | 1.61293 | 36.96 | 11.733 |
| 19 | −79.985 | 13.30 | | | 12.185 |
| 20 | ∞ | 1.50 | 1.52249 | 59.48 | 16.000 |
| 21 | ∞ | 0.84 | | | 16.000 |
| IM | ∞ | | | | |

-continued

Aspherical data

| i   | 3          | 4          | 16         | 17         |
|-----|------------|------------|------------|------------|
| K   | 0          | 0          | 0          | 0          |
| A4  | −1.107E−05 | 9.680E−06  | −2.298E−06 | 1.545E−05  |
| A6  | −2.926E−08 | 1.808E−08  | −1.424E−09 | −1.461E−08 |
| A8  | 5.105E−12  | 3.056E−10  | 2.159E−11  | 4.199E−11  |
| A10 | 0.000E+00  | 0.000E+00  | 0.000E+00  | 0.000E+00  |
| A12 | 0.000E+00  | 0.000E+00  | 0.000E+00  | 0.000E+00  |

Other various data

| FL  | 34.4 |
|-----|------|
| FNO | 1.44 |
| 2ω  | 44.9 |
| TL  | 75.0 | variable parameters

| object distance | aperture stop diameter | d10  | d15  |
|-----------------|------------------------|------|------|
| ∞ (POS1)        | 11.166                 | 2.25 | 5.51 |
| 228 mm (POS2)   | 11.166                 | 8.63 | 1.50 |

Example 4

Unit: mm
Surface data

| i      | r        | d        | nd      | vd    | R      |
|--------|----------|----------|---------|-------|--------|
| OB     | ∞        | variable |         |       |        |
| 1      | 30.000   | 1.00     | 1.67270 | 32.17 | 17.512 |
| 2      | 19.474   | 3.94     |         |       | 15.736 |
| 3      | 21.515   | 5.59     | 1.92286 | 20.88 | 15.457 |
| 4      | 45.016   | 0.10     |         |       | 14.699 |
| 5      | 22.053   | 1.22     | 1.84666 | 23.78 | 13.292 |
| 6      | 14.782   | 12.77    |         |       | 11.600 |
| 7      | −28.352  | 0.90     | 1.72825 | 28.32 | 11.400 |
| 8      | 23.192   | 0.01     | 1.51400 | 42.84 | 12.895 |
| 9      | 23.192   | 7.96     | 1.72916 | 54.67 | 12.901 |
| 10     | −35.235  | 3.94     |         |       | 13.254 |
| *11    | 51.590   | 5.78     | 1.74320 | 49.29 | 14.292 |
| *12    | −42.476  | 0.80     |         |       | 14.303 |
| 13(ST) | ∞        | variable |         |       | 13.051 |
| *14    | 46.705   | 1.00     | 1.58313 | 59.38 | 11.745 |
| *15    | 19.564   | variable |         |       | 10.879 |
| 16     | 284.383  | 0.90     | 1.67270 | 32.17 | 10.000 |
| 17     | 22.552   | 5.93     | 1.88300 | 40.80 | 10.736 |
| 18     | −58.149  | 0.10     |         |       | 10.995 |
| 19     | 29.602   | 4.41     | 1.72825 | 28.32 | 11.180 |
| 20     | 19.224   | 17.33    |         |       | 10.444 |
| 21     | ∞        | 1.50     | 1.52249 | 59.48 | 16.000 |
| 22     | ∞        | 0.80     |         |       | 16.000 |
| IM     | ∞        |          |         |       |        |

Aspherical data

| i   | 11         | 12         | 14         | 15         |
|-----|------------|------------|------------|------------|
| K   | 0          | 0          | 0          | 0          |
| A4  | −9.504E−06 | −3.877E−06 | −5.134E−07 | 3.621E−06  |
| A6  | −8.664E−09 | −5.691E−09 | −3.927E−08 | −4.895E−08 |
| A8  | 5.115E−12  | −1.066E−11 | 4.501E−11  | −5.911E−11 |
| A10 | 0.000E+00  | 0.000E+00  | 0.000E+00  | 0.000E+00  |
| A12 | 0.000E+00  | 0.000E+00  | 0.000E+00  | 0.000E+00  |

Other various data

| FL  | 34.4 |
|-----|------|
| FNO | 1.44 |
| 2ω  | 44.8 |
| TL  | 90.0 |

-continued

| variable parameters | | | |
|---|---|---|---|
| object distance | aperture stop diameter | d13 | d15 |
| ∞ (POS1) | 13.051 | 2.26 | 11.78 |
| 228 mm (POS2) | 13.051 | 8.44 | 5.60 |

Example 5

Unit: mm
Surface data

| i | r | d | nd | vd | R |
|---|---|---|---|---|---|
| OB | ∞ | variable | | | |
| 1 | 81.048 | 1.00 | 1.67270 | 32.17 | 16.334 |
| 2 | 23.068 | 6.48 | | | 14.800 |
| 3 | 26.807 | 6.93 | 1.90200 | 25.10 | 14.681 |
| 4 | −287.270 | 2.48 | | | 14.000 |
| *5 | 37.063 | 1.00 | 1.80860 | 40.42 | 12.511 |
| *6 | 21.783 | 6.70 | | | 11.816 |
| 7 | −38.746 | 0.90 | 1.80518 | 25.46 | 11.833 |
| 8 | 19.300 | 9.00 | 1.72916 | 54.67 | 12.988 |
| 9 | −38.716 | 0.20 | | | 13.325 |
| 10 | 41.882 | 5.94 | 1.72916 | 54.67 | 13.809 |
| 11 | −45.882 | 0.50 | | | 13.671 |
| 12(ST) | ∞ | variable | | | 12.507 |
| 13 | 118.583 | 0.90 | 1.56384 | 60.83 | 11.253 |
| 14 | 17.072 | variable | | | 10.106 |
| 15 | 544.243 | 0.80 | 1.64769 | 33.84 | 10.000 |
| 16 | 15.606 | 7.56 | 1.88300 | 40.80 | 10.480 |
| 17 | −44.593 | 5.23 | | | 10.500 |
| *18 | −13.460 | 1.20 | 1.58313 | 59.38 | 10.381 |
| *19 | −21.466 | 13.30 | | | 10.792 |
| 20 | ∞ | 1.50 | 1.52249 | 59.48 | 16.000 |
| 21 | ∞ | 0.80 | | | 16.000 |
| IM | ∞ | | | | |

Aspherical data

| i | 5 | 6 | 18 | 19 |
|---|---|---|---|---|
| K | 0 | 0 | 0 | 0 |
| A4 | −3.936E−06 | 1.236E−05 | 3.534E−04 | 3.070E−04 |
| A6 | −1.521E−07 | −1.346E−07 | −2.871E−06 | −2.670E−06 |
| A8 | 3.247E−10 | 2.680E−10 | 1.786E−08 | 1.532E−08 |
| A10 | −2.328E−13 | −3.050E−13 | −4.286E−11 | −3.756E−11 |
| A12 | 0.000E+00 | 0.000E+00 | 0.000E+00 | 0.000E+00 |

Other various data

| FL | 34.4 |
|---|---|
| FNO | 1.44 |
| 2ω | 44.8 |
| TL | 84.0 |

| variable parameters | | | |
|---|---|---|---|
| object distance | aperture stop diameter | d12 | d14 |
| ∞ (POS1) | 12.507 | 2.25 | 9.34 |
| 228 mm (POS2) | 12.507 | 5.85 | 5.74 |

TABLE 1

| Corresponding values in conditional expressions and related data | Example 1 | Example 2 | Example 3 | Example 4 | Example 5 |
|---|---|---|---|---|---|
| FL | 34.40 | 34.40 | 34.40 | 34.40 | 34.40 |
| 1Gr_Fl | 38.05 | 34.68 | 30.50 | 33.55 | 27.74 |
| 2Gr_Fl | −75.48 | −60.21 | −27.49 | −58.30 | −35.35 |
| 3Gr_Fl | 52.33 | 49.55 | 27.53 | 54.27 | 44.11 |
| 1Gr_R_nop | 29.95 | 28.37 | 30.18 | 44.82 | 40.03 |
| 1Gr_Thi | 30.69 | 30.34 | 31.84 | 43.20 | 40.63 |
| 2Gr_R_nop | −1.38 | −2.54 | 6.86 | 1.46 | 1.10 |

TABLE 1-continued

| Corresponding values in conditional expressions and related data | | Example 1 | Example 2 | Example 3 | Example 4 | Example 5 |
|---|---|---|---|---|---|---|
| | 2Gr_Thi | 8.90 | 6.74 | 10.72 | 1.00 | 1.00 |
| | β_2Gr | 2.08 | 2.24 | 3.56 | 2.14 | 3.04 |
| | β_3Gr | 0.44 | 0.44 | 0.32 | 0.48 | 0.41 |
| | 1aGr_Fl | −348.64 | −930.00 | 931.40 | −429.44 | 162.14 |
| | 1bGr_Fl | 30.82 | 28.82 | 25.71 | 29.96 | 29.67 |
| | TL | 78.00 | 75.00 | 75.00 | 90.00 | 84.00 |
| | ω | 22.43 | 22.43 | 22.43 | 22.43 | 22.43 |
| | W_2Gr | 7.53 | 6.85 | 7.89 | 2.58 | 4.29 |
| (1) | 1Gr_Fl/FL | 1.11 | 1.01 | 0.89 | 0.98 | 0.81 |
| (2) | \|2Gr_Fl/FL\| | 2.19 | 1.75 | 0.80 | 1.69 | 1.03 |
| (3) | 3Gr_Fl/FL | 1.52 | 1.44 | 0.80 | 1.58 | 1.28 |
| (4) | 1Gr_R_nop/1Gr_Thi | 0.98 | 0.93 | 0.95 | 1.04 | 0.99 |
| (5) | 2Gr_R_nop/2Gr_Thi | −0.15 | −0.38 | 0.64 | 1.46 | 1.10 |
| (6) | β_2Gr/β_3Gr | 4.76 | 5.08 | 11.23 | 4.45 | 7.45 |
| (7) | FL/1aGr_Fl | −0.10 | −0.04 | 0.04 | −0.08 | 0.21 |
| (8) | 1bGr_Fl/FL | 0.90 | 0.84 | 0.75 | 0.87 | 0.86 |
| (9) | TL/(FL × tanω) | 5.49 | 5.28 | 5.28 | 6.34 | 5.92 |
| (10) | W_2Gr | 7.53 | 6.85 | 7.89 | 2.58 | 4.29 |
| (11) | 2ω | 44.86 | 44.86 | 44.86 | 44.86 | 44.86 |

Although the present invention has been described and illustrated in detail, it is clearly understood that the same is by way of illustrated and example only and is not to be taken by way of limitation, the scope of the present invention being interpreted by terms of the appended claims.

What is claimed is:

1. An imaging optical system comprising
a first lens group of positive lenses, a second lens group of negative lenses, and a third lens group of positive lenses in order from an object side,
wherein focusing on a nearby object is performed by moving the entire second lens group along an optical axis toward an image side, and the following conditional expressions (1) to (5) are satisfied:

$$0.8 < 1Gr\_Fl/FL < 1.2 \quad (1),$$

$$0.6 < |2Gr\_Fl/FL| < 2.5 \quad (2),$$

$$0.6 < 3Gr\_Fl/FL < 1.8 \quad (3),$$

$$0.8 < 1Gr\_R\_nop/1Gr\_Thi < 1.1 \quad (4), \text{ and}$$

$$-0.6 < 2Gr\_R\_nop/2Gr\_Thi < 1.6 \quad (5),$$

where
FL represents a focal length of the entire system,
1Gr_Fl represents a focal length of the first lens group,
2Gr_Fl represents a focal length of the second lens group,
3Gr_Fl represents a focal length of the third lens group,
1Gr_R_nop represents a distance from the outermost surface of the first lens group on the object side to a rear principal point of the first lens group,
1Gr_Thi represents a total length of the first lens group,
2Gr_R_nop represents a distance from the outermost surface of the second lens group on the object side to a rear principal point of the second lens group, and
2Gr_Thi represents a total length of the second lens group.

2. The imaging optical system according to claim 1, wherein the following conditional expression (6) is satisfied:

$$2.0 < \beta\_2Gr/\beta\_3Gr < 12.0 \quad (6),$$

where
β_2Gr represents a lateral magnification of the second lens group when an object distance is infinite, and
β_3Gr represents a lateral magnification of the third lens group when the object distance is infinite.

3. The imaging optical system according to claim 1, wherein the first lens group includes a front group and a rear group in order from the object side,
the lens closest to the image side in the front group has a concave surface facing the image side,
the lens closest to the object side in the rear group has a concave surface facing the object side,
an axial spacing between the front group and the rear group is the largest among axial spacings in the first lens group, and
the following conditional expressions (7) and (8) are satisfied:

$$-0.2 < FL/1aGr\_Fl < 0.3 \quad (7), \text{ and}$$

$$0.6 < 1bGr\_Fl/FL < 1.0 \quad (8),$$

where
1aGr_Fl represents a focal length of the front group, and
1bGr_Fl represents a focal length of the rear group.

4. The imaging optical system according to claim 1, wherein
the first lens group includes at least one aspherical lens, and
the at least one aspherical lens has an aspherical shape on the object side, a curvature radius of the at least one aspherical shape being smaller at a longer distance from the optical axis.

5. The imaging optical system according to claim 1, wherein the third lens group includes a positive-power lens and a negative-power lens.

6. The imaging optical system according to claim 1, which is an imaging optical system for forming an optical image of an object on an imaging surface of an imaging element,
wherein, when half a diagonal length of a screen size of the imaging surface is set as a maximum image height, the following conditional expression (9) is satisfied:

$$4.0 < TL/(FL \times \tan \omega) < 6.5 \quad (9)$$

where
TL represents a total length of the entire system (a distance from a vertex of the lens surface closest to the object side to the imaging surface), and
ω represents a maximum half field angle.

7. The imaging optical system according to claim 1, wherein the following conditional expression (10) is satisfied:

$$W\_2Gr < 25 \quad (10)$$

where

W_2Gr represents a total weight (g) of lens components constituting the second lens group.

8. The imaging optical system according to claim 1, which is an imaging optical system for forming an optical image of an object on an imaging surface of an imaging element, wherein, when half a diagonal length of a screen size of the imaging surface is set as a maximum image height, the following conditional expression (11) is satisfied:

$$40 < 2\omega < 50 \quad (11)$$

where

ω represents a maximum half field angle.

9. An imaging optical device comprising:

the imaging optical system according to claim 1; and an imaging element configured to convert an optical image formed on an imaging surface into an electrical signal, wherein the imaging optical system is positioned so that an optical image of an object is formed on the imaging surface of the imaging element.

10. A digital apparatus comprising the imaging optical device according to claim 9, wherein the digital apparatus has at least one of a function to take a still image of an object and a function to take a moving image of an object.

* * * * *